US010650393B2

(12) United States Patent
Wirasinghe

(10) Patent No.: US 10,650,393 B2
(45) Date of Patent: *May 12, 2020

(54) MOVIE TRAILER VOTING SYSTEM WITH AUDIO MOVIE TRAILER IDENTIFICATION

(71) Applicant: TrailerVote Corp., Sunnyvale, CA (US)

(72) Inventor: Marco Wirasinghe, Sunnyvale, CA (US)

(73) Assignee: TrailerVote Corp., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/009,165

(22) Filed: Jun. 14, 2018

(65) Prior Publication Data

US 2019/0172076 A1    Jun. 6, 2019

Related U.S. Application Data

(63) Continuation-in-part of application No. 15/832,439, filed on Dec. 5, 2017.

(51) Int. Cl.
*G06Q 30/02* (2012.01)
*H04W 4/02* (2018.01)
*H04N 21/8549* (2011.01)
*G10L 19/018* (2013.01)

(52) U.S. Cl.
CPC ..... *G06Q 30/0201* (2013.01); *H04N 21/8549* (2013.01); *H04W 4/02* (2013.01); *G10L 19/018* (2013.01)

(58) Field of Classification Search
CPC . G06Q 30/0201; H04N 21/8549; H04W 4/02; G10L 19/018
See application file for complete search history.

(56) References Cited

U.S. PATENT DOCUMENTS

| | | | |
|---|---|---|---|
| 8,463,773 | B2 | 6/2013 | Moshrefi et al. |
| 9,202,233 | B1 | 12/2015 | Siegel et al. |
| 2004/0258046 | A1 | 12/2004 | Wu et al. |
| 2005/0081241 | A1 | 4/2005 | Chen |
| 2006/0085419 | A1 | 4/2006 | Rosen |
| 2008/0215760 | A1 | 9/2008 | Song et al. |
| 2011/0087523 | A1 | 4/2011 | Earl |

(Continued)

OTHER PUBLICATIONS

U.S. Appl. No. 15/ 832,494, Automated Event Planning System, filed Dec. 5, 2017

(Continued)

*Primary Examiner* — Anthony Bantamoi
(74) *Attorney, Agent, or Firm* — Lowenstein Sandler LLP

(57) ABSTRACT

A mobile computing device receives audio data comprising an audio encoding of a unique identifier associated with a movie trailer. The mobile computing device or a remote computing device decodes the audio encoding using a decoder and generates non-audio data comprising the unique identifier responsive to the decoding. The mobile computing device or the remote computing device determines that the unique identifier is associated with the movie trailer. The mobile computing device generates a prompt for user feedback regarding the movie trailer, receives the user feedback regarding the movie trailer, and sends the user feedback to the remote computing device.

20 Claims, 21 Drawing Sheets

(56) References Cited

U.S. PATENT DOCUMENTS

| | | | |
|---|---|---|---|
| 2011/0247044 A1 | 10/2011 | Jacoby | |
| 2011/0276680 A1 | 11/2011 | Rimon | |
| 2011/0307786 A1 | 12/2011 | Shuster | |
| 2012/0214544 A1 | 8/2012 | Shivappa et al. | |
| 2013/0132382 A1 | 5/2013 | Kuznetsov et al. | |
| 2014/0195428 A1 | 7/2014 | Ghetler | |
| 2014/0278969 A1 | 9/2014 | Newell et al. | |
| 2015/0039320 A1 | 2/2015 | Neuhauser et al. | |
| 2015/0046828 A1 | 2/2015 | Desai et al. | |
| 2015/0186509 A1 | 7/2015 | Kelly et al. | |
| 2015/0220967 A1 | 8/2015 | Ikai et al. | |
| 2015/0269945 A1 | 9/2015 | Taylor et al. | |
| 2015/0294374 A1* | 10/2015 | Mlodzinski | H04N 21/812 |
| 2016/0094598 A1* | 3/2016 | Gedikian | H04L 65/60 |
| 2016/0148122 A1* | 5/2016 | Paleja | G06Q 10/02 |
| 2016/0148126 A1 | 5/2016 | Paleja et al. | |
| 2016/0316262 A1 | 10/2016 | Chen | |
| 2017/0124818 A1 | 5/2017 | Ullrich et al. | |
| 2017/0193846 A1 | 7/2017 | Breaux et al. | |
| 2017/0195717 A1* | 7/2017 | Wang | H04N 21/4400 |
| 2018/0124472 A1* | 5/2018 | Staff | H04N 21/233 |
| 2018/0279201 A1* | 9/2018 | Pandya | H04W 40/22 |

OTHER PUBLICATIONS

U.S. Appl. No. 15/832,523, Movie Trailer Voting System, filed Dec. 5, 2107.

Extended European Search Report for European Patent Application No. 18183877.2 dated Jan. 8, 2019, 9 pages.

Cunningham, S. et al. "Second screen comes to the silver screen: A technology feasibility study regarding mobile technologies in the cinema", 2015 Internet Technologies and Applications (ITA), IEEE, Sep. 8, 2015, pp. 228-232; retrieved on Nov. 2, 2015.

"Ebay Feedback—WTF? Can't Leave Neutral or Negative Feedback for 7 Days?" Forum, Lotus Seven Club, May 23, 2014, 7 pages.

US Patent and Trademark Office, Final Office Action for U.S. Appl. No. 15/832,439 dated Dec. 26, 2018.

US Patent and Trademark Office, Non-Final Office Action for U.S. Appl. No. 15/832,439 dated Jun. 20, 2019.

International Search Report and Written Opinion for International Application No. PCT/US18/63914 dated Feb. 19, 2019, 11 pages.

Dooms et al. "A framework for Dataset Benchmarking and its Application to a New Movie Rating Dataset" in ACM Transactions on Intelligent Systems and Technology (TIST), Apr. 2016, 30 pages, downloaded from https://repositorio.uam.es/bitstream/handle/10486/674368/framework_dooms_ATIST_2016_ps.pdf?sequence=1.

US Patent and Trademark Office, Non-Final Office Action for U.S. Appl. No. 15/832,523 dated Mar. 7, 2018.

US Patent and Trademark Office, Final Office Action for U.S. Appl. No. 15/832,523 dated Jul. 13, 2018.

US Patent and Trademark Office, Non-Final Office Action for U.S. Appl. No. 15/832,439 dated May 21, 2018.

International Search Report and Written Opinion for International Application No. PCT/US18/31066 dated Jun. 11, 2018, 16 pages.

* cited by examiner

MOVIE TRAILER VOTING SYSTEM WITH AUDIO MOVIE TRAILER IDENTIFICATION

RELATED APPLICATIONS

This application is a continuation-in-part application of U.S. patent application Ser. No. 15/832,439, filed Dec. 5, 2017, which is incorporated by reference herein. This application is also related to co-pending U.S. patent application Ser. No. 15/832,494 entitled "AUTOMATED EVENT PLANNING SYSTEM" which was filed with the USPTO on Dec. 5, 2017 and U.S. patent application Ser. No. 15/832,523 entitled "MOVIE TRAILER VOTING SYSTEM" which was filed with the USPTO on Dec. 5, 2017.

TECHNICAL FIELD

This disclosure relates to the field of movies and in particular to a movie trailer voting system.

BACKGROUND

Movie theater chains such as AMC® Theaters, Regal Entertainment Group® and Cinemark® Theaters provide movie applications that users can install on their mobile phones and tablet computing devices. These movie applications enable users subscribe to theater memberships, browse movies that are playing or are coming soon, determine movie show times, and purchase tickets for movies.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

Figure 1:
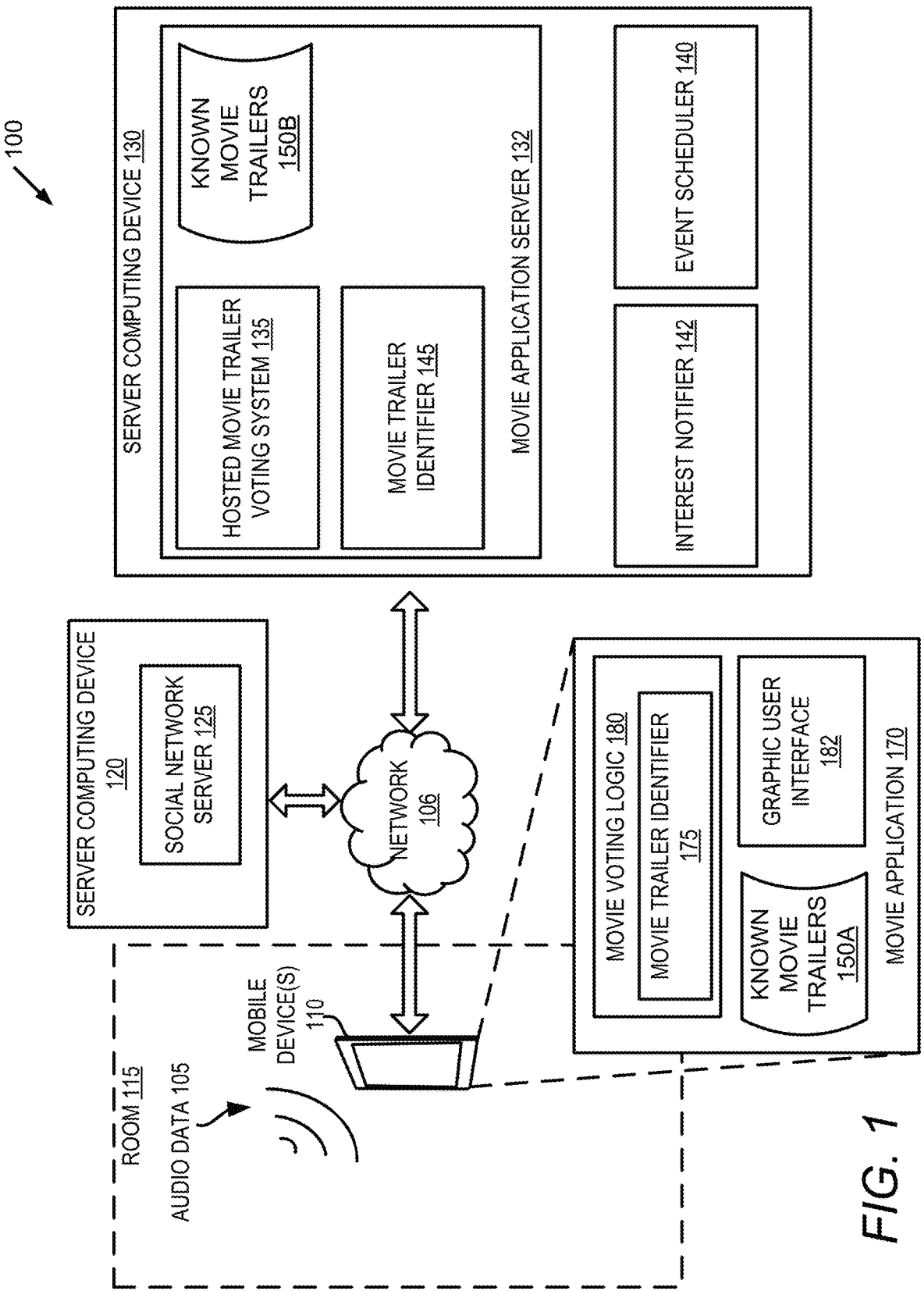
FIG. 1 is a block diagram illustrating a network environment in which embodiments of the present disclosure may operate.

Some embodiments described herein relate to a movie trailer voting system. Other embodiments relate to an event attendance scheduling system. These systems may be used together or separately to help users determine movies to see, to help movie theaters determine what movies to show, to help movie studios determine demand for their movies and adjust their marketing plans, and to help users identify other users with whom they could attend movies. Additionally, the event attendance scheduling system may be used to schedule joint attendance of events other than movies, such as sporting events, comedy shows, plays, musicals, concerts, and so on.

At any given movie showing, there are generally 10-20 minutes of movie trailers that precede the feature presentation. Movie trailers are generally about 2.5 minutes long, so there are generally about 4-10 movie trailers that are shown prior to the feature presentation. On average, people attend around 5.6 movie showings at theaters a year. Accordingly, viewers are exposed to around 20-60 movie trailers each year just from previews shown at theaters.

Viewers of movie trailers generally have a positive reaction, a neutral reaction, or a negative reaction about the movie associated with the movie trailers. However, presently there is no mechanism for capturing viewer reactions of the mainstream public (also referred to herein as user sentiment or user feedback). Accordingly, viewers of movie trailers often forget about movies that they were interested in seeing on the viewing of a movie trailer as well as about movies that they were not interested in seeing on the viewing of a movie trailer. Moreover, a movie theater has inadequate information as to which movies will be in demand and which movies will not be in demand. This leads to inefficient allocation of theater resources. For example, theaters have to guess about how many screens to allocate for particular movies and how many daily showings to allocate for particular movies. Furthermore, movie studios don't generally know the demand for their movies, and don't know which particular individuals have interest in seeing their movies.

Embodiments are described for a movie trailer voting system that enables users to vote on or rate movie trailers that they watch as those movie trailers are watched. Embodiments capture the sentiment of users towards movies from movie trailers of those movies. Such sentiments are then stored, and may be used for multiple purposes. The user sentiment toward the movies may be used to notify users interested in a movie when that movie is in theaters, to notify users of special promotions or exhibitions, and/or to notify users when that movie will stop playing in theaters. The user sentiment may also be used to find friends, family, coworkers, group members, and acquaintances who are interested in seeing the same movie and arranging or scheduling joint attendance of a movie theater showing for those friends, family and/or acquaintances. Additionally, the user sentiment may be captured for many users, and may be reported to movie studios and/or movie theaters to indicate demand for particular movies.

In one embodiment, a mobile device (e.g., a mobile computing device) executing a movie application activates a microphone and receives audio data via the microphone. The mobile device identifies a movie trailer from the audio data and generates a prompt for user feedback regarding a movie associated with the movie trailer. The mobile device receives user feedback from a user regarding the movie associated with the movie trailer. The mobile device or a server computing system may then determine a likelihood that the user will attend a showing of the movie at a theater based on the user feedback. For example, the prompt may ask "are you interested in seeing this movie?" The user may swipe left to indicate no, and may swipe right to indicate yes. Accordingly, the likelihood that the user will attend the showing may be determined from the user feedback. The user feedback may be stored on the mobile device and/or may be sent to a server computing device.

In one embodiment, a mobile computing device receives audio data of a movie trailer, wherein the audio data comprises an audio encoding of a unique identifier associated with the movie trailer. The audio encoding may be, for example, an audio watermark associated with the movie trailer. The mobile computing device decodes the audio encoding using a decoder. Alternatively, the mobile computing device may send the audio encoding to a remote computing device, which may decode the audio encoding. The mobile computing device generates non-audio data comprising the unique identifier responsive to the decoding. Alternatively, the mobile computing device may receive the non-audio data comprising the unique identifier from the remote computing device. The mobile computing device determines that the unique identifier is associated with the movie trailer. The mobile computing device generates a prompt for user feedback regarding the movie trailer, receives the user feedback regarding the movie trailer, and sends the user feedback to a remote computing device.

In further embodiments, the audio encoding may also include other information instead of or in addition to the unique identifier. The audio encoding may include encoded audio representing location data, metadata, language data, images, layout data, universal resource locators (URLs), application programming interfaces (APIs), movie titles, controls, fonts, sounds, media, and/or other information. The mobile computing device may decode the audio encoding to generate non-audio data comprising the location data, metadata, language data, images, layout data, universal resource locators (URLs), application programming interfaces (APIs), movie titles, controls, fonts, sounds, media, and/or other information. The mobile device may then render and output graphics and/or audio based on the non-audio data generated based on the decoding.

In further embodiments, multiple different audio encodings may be played for a movie trailer concurrently and/or an audio encoding may include multiple different options to be selected between. The mobile device may decode at least portions of each of the different audio encodings and select the non-audio data generated from one of the audio encodings. Alternatively, or additionally, the mobile device may select one or more portions of the non-audio data generated from a single audio encoding. The selection of the non-audio data and/or the portion of non-audio data may be made based on one or more properties of the mobile device, such as its location, its language setting, a company associated with an application executing on the mobile device, and so on. Different experiences may be provided based on the selection. For example, a first audio encoding may include English data and a second audio encoding may include French data. The first audio encoding may be selected if the mobile device is located in the United States and/or if the mobile device has an English language setting.

In further embodiments, all of the information needed to identify and vote on or rank or rate a movie trailer is included in the audio encoding that is included in the audio of the movie trailer (e.g., as an audio watermark). Such information may include layout information, graphics information, a movie title, a movie trailer length, a time stamp into the movie trailer, a URL and/or API to use to send user feedback to, and so on. Accordingly, a mobile device may receive all data associated with a movie trailer from the audio of the movie trailer itself, and may identify a movie trailer, synchronize a movie trailer voting experience, receive user feedback, and so on without having a network connection and without having any pre-stored information about the movie trailer.

In one embodiment, a system includes a digital projector and a computing device connected to the digital projector by a network. The digital projector may send a first message to the computing device when it is ready to begin projecting content associated with a feature movie (also referred to herein as a feature presentation), wherein the first message comprises an indication that the digital projector is to begin projecting content associated with the feature movie in a room of a theater. The digital projector may then project a sequence of movie trailers prior to projection of the feature movie. Responsive to receipt of the first message from the digital projector, the computing device may determine the content associated with the feature movie, which may include determining the sequence of movie trailers. The computing device may identify a plurality of mobile devices located in the room of the theater and send identifiers of the movie trailers in the sequence of movie trailers to the plurality of mobile devices. The mobile devices (e.g., mobile phones) may then prompt users to vote on the movie trailers presented in the sequence. Responsive to the voting, the computing device may receive, from one or more of the plurality of mobile devices, user feedback regarding the movies associated with the movie trailers.

In one embodiment, a computing device determines a first event attendance pattern for a first user account, wherein the first event attendance pattern comprises data on days that a first user associated with the first user account attends events and data on locations at which the first user attends events. The computing device further determines that the first user has an interest in attending an upcoming event. The computing device further determines a second event attendance pattern for a second user account, wherein the second event attendance pattern comprises data on days that a second user associated with the second user account attends events and data on locations at which the second user attends events. The computing device further determines that the second user has an interest in attending the upcoming event. The computing device further determines that the first user has a relationship with the second user.

Subsequent to making the aforementioned determinations, the computing device determines whether the first user and the second user have compatible event attendance patterns. Identifying compatible event attendance patterns may include determining a first overlap between the days that the first user attends events and the days that the second user attends events. Determining compatible event attendance patterns may further include determining a second overlap between the locations at which the first user attends events and the locations at which the second user attends events. The first user and the second user may have compatible event attendance patterns if the first overlap comprises at least one day and the second overlap comprises at least one location.

Responsive to determining that the first user and the second user have compatible event attendance patterns, the computing device sends a first message to the first user account, wherein the first message comprises an inquiry as to whether the first user has an interest in attending the upcoming event with the second user, and receives a first response from the first user account indicating that the first user has an interest in attending the upcoming event with the second user. Additionally, the computing device sends a second message to the second user account, wherein the second message comprises an inquiry as to whether the second user has an interest in attending the upcoming event with the first user, and receives a second response from the second user account indicating that the second user has an interest in attending the upcoming event with the first user. The computing device then schedules joint attendance to the upcoming event for the first user account and the second user account for a day that is within the first overlap and for a location that is within the second overlap.

Embodiments are discussed with reference to a user feedback experience associated with a movie trailer. The user feedback may include identification of a movie trailer, voting and/or rating of the movie trailer, liking the movie trailer, emoting about the movie trailer, and so on. However, it should be understood that embodiments described herein also apply to other types of video clips that may be shown prior to a feature movie presentation and/or after a feature movie presentation. For example, video clips that are advertisements for local, regional and/or national products and/or services may be identified, and user feedback for such video clips may be received according to embodiments. For example, a user may actively engage with a second screen experience (e.g., on the screen of their mobile device) related to the video clip or advertisement in a similar manner to how they would engage with a second screen experience for a movie trailer. This may include, for example, setting up a test drive, creating a reminder, purchasing a product on the spot, and so on. This may also include passively noting which movie trailer was shown and/or which user was exposed to a video clip or advertisement. Accordingly, those embodiments described herein with reference to movie trailers also apply equally to other video clips shown at a movie theater (e.g., before a feature presentation begins and/or after a feature presentation ends). Additionally, for embodiments described herein in which movie trailers are identified using audio data (e.g., audio encodings of unique identifiers associated with movie trailers and/or other information embedded in audio encodings), these embodiments also apply to still image advertisements shown on a movie screen. Such still images may be displayed along with audio, and that audio may be used to identify the advertisement (e.g., may include an audio encoding of a unique identifier associated with such an advertisement and/or an audio encoding of other information). Users may vote on, rank, like, rate, or otherwise emote about such advertisements in the same manner that is described for movie trailers herein below. An application executing on a mobile device may also make an offer, set a reminder, initiate a purchase, set a delivery option, and so on with reference to a video clip or advertisement in the same manner in which these operations may be performed with reference to a movie trailer, as discussed herein. For example, if a user is shown an advertisement for a product, the user might have the option to click on an "add to cart" button and/or a "purchase" button, which may cause the product to be added to a cart of a user account for an ecommerce store (e.g., Amazon) and/or to be purchased from the ecommerce store.

FIG. 1 is a block diagram illustrating a network environment 100 in which embodiments of the present disclosure may operate. In one embodiment, network environment 100 includes one or more mobile devices 110, a server computing device 120, a server computing device 130, and network 106 over which the mobile devices 110 and/or server computing devices 120, 130 may communicate. The network 106 can include a local area network (LAN), a wireless network, a telephone network, a mobile communications network, a wide area network (WAN) (e.g., such as the Internet) and/or similar communication system. The network 106 can include any number of networking and computing devices such as wired and wireless devices.

The server computing device 120 and server computing device 130 may include a physical machine and/or a virtual machine hosted by a physical machine. The physical machine may be a rackmount server, a desktop computer, or other computing device. The physical machine may be located on a movie theater premises or may be at a distant location. In one embodiment, the server computing devices 120, 130 can include a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

Mobile devices 110 are mobile computing devices such as an electronic book reader, portable digital assistant, mobile phone, laptop computer, portable media player, tablet computer, camera, video camera, netbook, notebook, and the like. Mobile devices 110 may include a memory, a processing device (e.g., one or more microprocessor), a display, a microphone, speakers, and so on.

Each mobile device 110 may include installed thereon a movie application 170. The movie application 170 may include a graphic user interface (GUI) 182, movie voting logic 180 and/or data for one or more known movie trailers 150A. The graphic user interface 182 may provide a menu of display options. A user may navigate the GUI by selecting (e.g., pressing buttons associated with) options to preview movies playing in theaters, view trailers, purchase movie tickets, and so on. A user may select to organize or filter movies by location, movie, genre, playtime, and so on. The movie application 170 on each mobile device 110 is associated with a particular user account of a movie application server 132. The movie application 170 may log into the movie application server 132 using credentials and/or identifiers generated for and/or associated with a particular user account.

In one embodiment, the movie application 170 includes a movie voting logic 180. The movie voting logic 180 enables users to vote on, rate or rank movie trailers. The ranking, rating or voting applied to a movie trailer for a user account indicates user sentiment about a movie represented in the movie trailer. The user sentiment may reflect that user's level of interest in seeing the movie. Alternatively, the user's level of interest in seeing the movie may be determined from a rating of the movie trailer and/or ratings of one or more other movie trailers for the same movie. In addition to or instead of providing a vote or a ranking of a movie trailer, a user may also provide other types of user feedback relating to the movie trailer and/or relating to the movie associated with the movie trailer. For example, the user may emote on the movie trailer, such as indicating a like, dislike, etc. about the movie trailer.

In one embodiment, movie voting logic 180 includes a movie trailer identifier 175. Movie trailer identifier 175 uses audio data to detect movie trailers being watched by a user of a mobile device 110. The audio data may include standard audio data that is audible to humans and/or may include additional audio data that may be inaudible to humans (e.g., an ultrasonic audio code or unique identifier, an audio encoding of other data associated with the movie trailer, and so on). A user may select to enter a movie trailer voting mode by selecting a movie trailer voting option in the GUI 182. Responsive to selection of the movie trailer voting mode, GUI 182 may prompt the user for permission to enable and/or use a microphone of the mobile device 110.

Once the user provides permission to activate and/or use the microphone, movie trailer identifier 175 begins sampling audio. Mobile device 110 may be located in a room 115 in which a movie trailer is being played. In one embodiment, the room 115 is a room of a movie theater (e.g., a theater room). Alternatively, the room 115 may be a room in a house in which a movie and/or movie trailer is being played. For example, the room 115 may be a living room, an entertainment room, and so on. Mobile device 110 receives audio data 105, which includes the audio track of the movie trailer output by speakers in the room 115. The audio data 105 may additionally include other audio data, such as conversations of other movie goers, coughing, sneezing, and/or other background noises.

In some embodiments, the audio data 105 includes an audio encoding of a unique identifier associated with the movie trailer (e.g., an audio encoding that is in the ultrasonic frequency range) and/or an audio encoding of other data. Examples of other types of data that may be encoded into an audio encoding include metadata such as a movie title, a movie studio name, a movie show time and/or date, a location, a movie theater identification, an identifier of a room of a movie theater, a version of a movie trailer, a movie identifier, a URL, an API, internationalized strings, actor information, director information, producer information, studio information, genre, movie trailer length, a timestamp of a time offset into the movie trailer and/or a time remaining in the movie trailer, custom voting buttons, survey data (e.g., including questions and/or options), and so on. Other example of types of data that may be encoded into the audio encoding include rich content such as a soundtrack (e.g., for a particular region), one or more images (e.g., an image of a movie poster for the movie associated with the movie trailer, images to use for voting buttons, images to use for a background, screen shots of the movie, etc.), one or more video clips and/or animated images (e.g., an animated GIF file), and so on.

Movie trailer identifier 175 then attempts to identify the movie trailer based on the received audio data 105. Movie trailer identifier 175 may attempt to identify the movie locally on the mobile device 110 and/or by sending an inquiry to movie application server 132.

In one embodiment, movie trailer identifier 175 sends the audio data 105 to movie application server 132 for identification. Captured audio data 105 may be captured by movie trailer identifier 175 and sent to movie application server 132 in the form of an audio recording or an audio stream. Captured audio data 105 may have a compressed or uncompressed audio format. Compressed audio formats may have lossy compression or lossless compression. Examples of audio formats that may be used include waveform audio file format (WAV), audio interchange file format (AIFF), free lossless audio codec (FLAC), Windows® media audio lossless (WMA lossless), Apple® lossless (ALAC), Opus, Moving Picture Experts Group audio layer III (MP3), Vorbis, advanced audio coding (AAC) and adaptive transform acoustic coding (ATRAC), to name a few.

In one embodiment, movie trailer identifier 175 sends a portion of the audio data to the movie application server 132. For example, movie trailer identifier 175 may send the audio encoding of the unique identifier and/or other data to the movie application server 132. The audio encoding of the unique identifier and/or other data may have been encoded using an encoder that uses one or more audio modulation schemes such as frequency shift keying, phase shift keying, pulse modulation, and so on. The movie application server 132 may include a decoder that includes the same one or more audio modulation schemes used by the encoder. The decoder may process the audio encoding to reproduce a non-audio representation of the unique identifier (e.g., a text, numerical or alphanumerical representation of the unique identifier) and/or other information. Once the audio encoding of the unique identifier has been decoded, then a movie trailer being played in the room 115 is identified. The movie application server 132 may then send information about the movie trailer to the mobile device 110. The information about the movie trailer may include the non-audio representation of the unique identifier and/or additional information such as screen shots, actor information, director information, producer information, studio information, genre, movie trailer length, and so on. GUI 182 may then display information about the detected movie trailer, and/or may indicate a length of the movie trailer and/or a current time offset or index into the movie trailer that is being played in the room 115.

In one embodiment, movie trailer identifier 175 includes a decoder that includes the same one or more audio modulation schemes used by an encoder to generate the audio encoding of the unique identifier. The decoder may process the audio encoding to reproduce a non-audio representation of the unique identifier and/or other data (e.g., a text, numerical or alphanumerical representation of the unique identifier).

Once the audio encoding of the unique identifier has been decoded, then a movie trailer being played in the room 115 may be identified. Movie application 170 may already have information about the movie trailer stored locally (e.g., the movie trailer may be one of known movie trailers 150A). In such an instance, the non-audio version of the unique identifier associated with the movie trailer may be compared to unique identifiers of the known movie trailers 150A, and a match may be identified. GUI 182 may then display information about the detected movie trailer, and/or may indicate a length of the movie trailer and/or a current time offset or index into the movie trailer that is being played in the room 115.

If the unique identifier does not match unique identifiers associated with any known movie trailers 150A, then movie application 170 may send the unique identifier (the non-audio version of the unique identifier) to movie application server 132. Movie application server 132 may then determine that the unique identifier matches a unique identifier associated with one of known movie trailers 150B, and may then send information about that identified movie trailer to movie application 170. GUI 182 may then display the received information about the detected movie trailer, and/or may indicate a length of the movie trailer and/or a current time offset or index into the movie trailer that is being played in the room 115.

In some embodiments, the audio encoding includes all of the information necessary to identify the movie trailer and/or to vote on the movie trailer. Such information may include layout information, graphics information, a movie title, a movie trailer length, a time stamp into the movie trailer, a URL and/or API to use to send user feedback to server computing device 130, and so on. Accordingly, mobile device 110 may receive all data associated with a movie trailer from the audio data 105 of the movie trailer itself. Movie trailer identifier 175 may determine the title of the movie, the length of the movie trailer, when the movie trailer will end, and/or a current time offset into the movie trailer from decoding the audio encoding. Movie voting logic 180 may then use the decoded data from the audio encoding to synchronize the prompting of a user to vote on or rate a movie trailer with the playback of the movie trailer (e.g., to prompt the user for user feedback at or around a time when the movie trailer ends). Movie voting logic 180 may then receive the user feedback and use the decoded data (e.g., URL and/or API) to provide the user feedback to the server computing device and/or to another computing device.

In one embodiment, the audio encoding of the unique identifier associated with a movie trailer is played throughout the movie trailer or periodically during playback of the movie trailer. This enables the movie trailer to be identified, but does not provide information regarding a current time offset into the movie trailer. In another embodiment, the audio encoding of the unique identifier is played only at the beginning of the movie trailer. This enables the start time of the movie trailer to be identified. The length of the movie trailer and the start of the movie trailer can then be used to determine an end time of the movie trailer (e.g., by adding the length of the movie trailer to a time stamp associated with the start of the movie trailer). However, in such an embodiment users who activate their microphones after the movie trailer has begun may not be able to identify the movie trailer.

In another embodiment, audio encodings of different unique identifiers are played at different time offsets into the movie trailer. For example, a first audio encoding of a first unique identifier may be played at the start of the movie trailer, a second audio encoding of a second unique identifier may be played at the mid-point of the movie trailer, and a third audio encoding of a third unique identifier may be played 10 seconds before an end of the movie trailer. Each of the first unique identifier, the second unique identifier and the third unique identifier may be associated with a different known time offset into the movie trailer, and thus the time stamp of when a specific unique identifier was detected and the known time offset into the movie trailer for that unique identifier may be used to determine a current time offset of the movie trailer and to compute a predicted end time of the movie trailer. Even if an earlier audio encoding associated with a movie trailer is not detected, then a later audio encoding may be detected, and the end time of the movie trailer may be determined from that detected audio encoding.

In another embodiment, slightly different audio encodings may be played on a periodic basis, where each of the audio encodings includes an audio encoding of a different timestamp that indicates a time offset into the movie trailer and/or a remaining time in the movie trailer. The periodic basis may be every 5 seconds, every 10 seconds, every 12 seconds, every 15 seconds, or some other interval. The different audio encodings may otherwise be identical in embodiments. For example, the different audio encodings may include different timestamps but include the same movie trailer identifier, the same movie identifier, the same movie title string, the same URL, the same API, the same image(s), and/or other matching data.

In one embodiment movie trailer identifier 175 generates digital fingerprints of the audio data 105, and sends the digital fingerprints to movie application server 132. In one embodiment, the audio data 105 is divided into multiple portions, and a digital fingerprint is generated from each portion. For example, the audio data 105 may be divided into portions that are 1 second, 2 seconds, 3 seconds, 5 seconds, 6 seconds, 8 seconds, 10 seconds, 15 seconds, 20 seconds, and so on in length. A digital fingerprint may be generated for each portion of the audio data 105 or for a subset of the portions. Identification of the movie trailer may then be determined using the generated digital fingerprints for one or more of the portions of the audio data 105.

Movie trailer identifier 175 may generate digital fingerprint(s) using conventional techniques known in the art. For example, a digital fingerprint of a portion of audio data 105 may be a feature vector generated by extracting features from a portion of the audio data 105. Examples of acoustical features that may be extracted from audio data 105 and included in a digital fingerprint of a portion of the audio data may include loudness, pitch, bass, brightness, bandwidth, Mel-frequency cepstral coefficients (MFCCs), and so forth. A digital fingerprint may additionally or alternatively include first and/or second derivatives of some or all of these features. A digital fingerprint may additionally or alternatively include statistical measurements such as mean and standard deviations of first order features.

In one embodiment, movie trailer identifier 175 generates a stream of digital fingerprints, and sends the stream of digital fingerprints to movie application server 132.

In one embodiment, movie trailer identifier 175 generates digital fingerprints from the audio data 105 and then attempts to identify the movie trailer based on comparison of the digital fingerprint to digital fingerprints of known movie trailers 150A. Movie application 170 may store digital fingerprints of multiple known movie trailers that are being played in theaters. At any given time, there may be anywhere from about 10-100 movie trailers that are being shown in theaters. The known movie trailers 150A may be kept up to date so that mobile device 110 stores information about the known movie trailers 150A that are presently in theaters, but does not necessarily store information about known movie trailers that are no longer shown in theaters and/or known movie trailers that have not yet started showing in theaters.

This may keep the amount of data associated with the known movie trailers 150A that is stored on mobile devices 110 to a minimum.

Movie trailer identifier 175 may compare a generated digital fingerprint of audio data 105 to stored digital fingerprints of the known movie trailers 150A. In one embodiment, the generated digital fingerprint is compared to digital fingerprints of overlapping portions of known movie trailers. For example, the generated digital fingerprint may be compared to a first digital fingerprint of seconds 1-5 of a known movie trailer, to a second digital fingerprint of seconds 2-6 of the known movie trailer, to a third digital fingerprint of seconds 3-7 of the known movie trailer, and so on. For each comparison, a similarity score may be generated that indicates a similarity between the digital fingerprint and a digital fingerprint of a known movie trailer 150A. A similarity score that exceeds a similarity threshold indicates a match between the audio data 105 and a portion of a known movie trailer 150A.

Multiple digital fingerprints may be stored of each known movie trailer 150A, and the digital fingerprint of the audio data 105 may be compared to some or all of the digital fingerprints for a given known movie trailer 150A. In one embodiment, comparisons between the generated digital fingerprint of the audio data 105 and the digital fingerprints of the known movie trailers 150A are made until a match is found between a generated digital fingerprint and a stored digital fingerprint of a portion of a known movie trailer 150A. Similarity values may be computed based on the comparison of the generated digital fingerprint to one or more digital fingerprints of known movie trailers. The similarity value may be based on a similarity of one or more features of the generated digital fingerprint to one or more features of a digital fingerprint of a known movie trailer. A match may be found when a similarity value between the generated digital fingerprint and a digital fingerprint of a known movie trailer satisfies a match criterion. In one embodiment, the match criterion is a similarity threshold. Accordingly, if a similarity value exceeds a similarity threshold, then a match may be determined.

Once a match is determined between the generated digital fingerprint of the audio data 105 and a stored digital fingerprint of a known movie trailer, then a movie trailer being played in the room 115 is identified. Additionally, each stored digital fingerprint may be associated with a start and end time index. The time indexes may be time offsets into the movie trailer. Accordingly, the matching digital fingerprint of the known movie trailer 150A may be used to identify the time offset into the detected movie trailer. The stored information about the known movie trailers 150A may include additional information such as screen shots, actor information, director information, producer information, studio information, genre, movie trailer length, and so on. Once the movie trailer is identified, GUI 182 may display information about the detected movie trailer, and may indicate a length of the movie trailer and a current time offset or index into the movie trailer that is being played in the room 115.

In one embodiment, the movie trailer identifier 175 generates digital fingerprints until a match is found between a digital fingerprint and a stored digital fingerprint of a known movie trailer 150A. In one embodiment, once a match is found, movie trailer identifier 175 may stop generating digital fingerprints. This may conserve battery life of the mobile device 110. In one embodiment, once a match is found, movie application 170 temporarily disables the microphone and/or stops receiving audio data captured by the microphone. The detected time offset into the movie trailer and the known length of the movie trailer may be used by movie trailer identifier 175 to predict a time at which the movie trailer will end.

At or around the predicted time at which the movie trailer will end, movie voting logic 180 may prompt a user of mobile device 110 to provide user feedback (e.g., user sentiment) about the movie trailer. Alternatively, the prompt to provide user feedback about the movie trailer may be output to a display of mobile device 110 upon identification of the movie trailer. In such an embodiment, a further prompt may be provided at around a time that the movie trailer ends to draw the user's attention to the previously output prompt for user feedback. The prompt and/or further prompt may be accompanied by or include a brightening of the mobile device's display, a vibration of the mobile device 110, a quiet audio alert, and so on.

The prompt for user feedback may include a request for a rating of the movie trailer. The rating may be, for example, on a rating system of 1-5 or 1-10 stars, where a lower number of stars indicates a lower interest level in the movie associated with the movie trailer. A voting prompt may ask for a user to vote "yes" or "no" as to whether the user would like to watch the movie associated with the movie trailer, or may ask the user to vote "yes", "no", or "maybe" as to whether the user would like to watch the movie associated with the movie trailer. A prompt may also provide options for a user to "like" or "dislike" a movie trailer, or to indicate "no preference" about the movie trailer, or to otherwise emote about the movie trailer.

Additionally, other types of user input options may be provided and/or other information may be provided in the prompt. For example, the prompt may include coupons, reminders, notices, hyperlinks, and so on. The prompt may additionally include an option for a user to pre-order movie tickets, to purchase other goods or services associated with the movie trailer (e.g., a product shown in the movie trailer), to add goods or services to a cart, and so on. For example, the prompt might include the option to click on an "add to cart" button and/or a "purchase" button, which may cause a product to be added to a cart of a user account for an ecommerce store (e.g., Amazon) and/or to be purchased from the ecommerce store.

Once a user has provided user feedback, movie application 170 may send a message to movie application server 132 and/or to another remote computing device that includes the user feedback. Movie application server 132 and/or the other remote computing device may then store the user feedback in the user account associated with a mobile device 110 from which the user feedback was received. If positive user feedback is received for a movie trailer, movie application server 132 may add the associated movie to a viewing list for the associated user account.

In some instances, a movie studio may produce multiple movie trailers for the same movie. Accordingly, a digital fingerprint may math digital fingerprints of multiple movie trailers. If matches to digital fingerprints of multiple movie trailers are identified, then movie trailer identifier 175 may continue generating digital fingerprints from audio data and comparing these digital fingerprints to additional digital fingerprints of the movie trailers for which matches were identified. This process may continue until there is only one movie trailer having digital fingerprints that match the digital fingerprints of the audio data 105. User feedback may be correlated to specific movie trailers of movies, which may enable AB testing of movie trailers to determine which movie trailers generate the most user interest.

In an example, a movie trailer identifier 175 may generate a first digital fingerprint of a first portion of the audio data and compare that digital fingerprint to digital fingerprints of a plurality of known movie trailers 150A. The movie trailer identifier 175 may determine similarity values between the first digital fingerprint and the digital fingerprints of the plurality of known movie trailers. Movie trailer identifier 175 may then determine that the first similarity value between the first digital fingerprint and a second digital fingerprint associated with a first movie trailer satisfies a match criterion and may additionally determine that a second similarity value between the first digital fingerprint and a third digital fingerprint associated with a second movie trailer also satisfies the match criterion. Accordingly, the movie trailer identifier 175 may generate a fourth digital fingerprint of a second portion of the audio data. The movie trailer identifier 175 may then compare the fourth digital fingerprint to one or more additional digital fingerprints of the first movie trailer and to one or more additional digital fingerprints of the second movie trailer. If matches are found for both movie trailers, then still further digital fingerprints of portions of the audio data may be generated and compared to digital fingerprints of the first and second movie trailers. This process may continue until a match is only identified to one movie trailer.

Typically multiple movie trailers are played prior to a feature movie in a movie theater. Accordingly, in addition to outputting a prompt when a movie trailer ends, movie trailer identifier 175 may start generating additional digital fingerprints of audio data 105 at around the time that the movie trailer ends (e.g., shortly before the movie trailer is estimated to end). This enables digital fingerprints to be generated for a next movie trailer so that the next movie trailer may be identified and voted on or rated. Alternatively, movie trailer identifier 175 may detect and/or decode a new audio encoding of a new unique identifier and/or other data associated with a next movie trailer.

In one embodiment, movie trailer identifier 175 generates a digital fingerprint of audio data 105, and then compares the digital fingerprint to stored digital fingerprints of known movie trailers 150A. If no match is identified (e.g., the similarity values for comparisons between the digital fingerprint of the captured audio and digital fingerprints of known movie trailers all fail to satisfy a match criterion), then movie trailer identifier 175 sends the digital fingerprint of the audio data 105 to movie application server 132 for identification. A hosted movie trailer identifier 145 of a movie application server 132 may then compare the digital fingerprint to digital fingerprints of a larger set of known movie trailers 150B to identify the unknown movie trailer, as described below. Once a match is found between the digital fingerprint and a stored digital fingerprint of a known movie trailer, movie application server 132 may determine a time offset into the movie trailer that is associated with the matching digital fingerprint, determine a length of the movie trailers, and compute a time at which the movie trailer ends based on the time offset and the length of the movie trailer. The movie application server 132 may then send a message to the movie application 170 on the mobile device 110 that comprises an indication of the movie trailer that was identified, the time offset into the movie trailer for which an identification was made and a time at which the movie trailer ends. The movie application 170 may use this information to vibrate, prompt a user to vote on the movie trailer and/or increase a display brightness when the movie trailer ends.

Movie trailer identification and voting has been described with reference to a mobile device 110 that includes a movie application that includes movie voting logic 180. However, in some instances a mobile device 110 may lack a movie application 170 or may include a movie application that lacks a movie voting logic 180. In such instances, a mobile website (e.g., a movie trailer voting website) may be used to provide the same functionality described with reference to the movie voting logic 180. In one embodiment, mobile device 110 uses a mobile web browser to navigate to a mobile website that provides a movie trailer voting experience. The mobile website may offer all of the same functionality as described with reference to the movie application 170. In an example, a message may be presented on the screen in the room 115 that prompts users to text a particular message (e.g., a short message service (SMS) message or a multimedia messaging service (MMS) message) to an identified address or phone number. The message may be sent using a messaging protocol such as SMS, MMS, email, iMessage®, WhatsApp®, GroupMe®, WeChat®, Facebook® Messenger, Google® Hangouts, and so on. The particular message may be or include a key that identifies a particular feature movie, that identifies a desire to access a movie trailer experience and/or that identifies a particular showing of a feature movie. Responsive to receiving the message, movie application server 132 may generate a link (e.g., a universal resource locator (URL) or hyperlink) to an instance of the movie voting website, and may send a response message to the mobile device 110. The response message may be sent using the same messaging protocol that the mobile device 110 used to send the initial message. Alternatively, a different messaging protocol may be used.

Responsive to mobile device 110 receiving the response message, a user may select the link to navigate to the instance of the movie trailer voting website. This may cause the mobile device 110 to download data such as a JavaScript or other script that may perform one or more of the operations of movie voting logic 180.

In one embodiment, server computing device 130 includes a movie application server 132 and an event scheduler 140. Movie application server 132 may interface with one or more movie applications 170 to provide a movie trailer voting experience. Additionally, or alternatively, movie application server 132 may interface with mobile web browsers of mobile devices 110 to provide a movie trailer voting experience. In one embodiment, movie application server 132 includes a hosted movie trailer voting system 135, a movie trailer identifier 145 and a database of known movie trailers 150B.

Hosted movie trailer voting system 135 may provide the movie trailer voting experience described above to mobile devices 110 via a mobile website. Accordingly, a mobile device 110 may navigate to a movie trailer voting website provided by the hosted movie trailer voting system 135, and may receive a prompt requesting permission to activate and/or use the microphone of the mobile device 110. The mobile device 110 may then capture audio data 105 and send the audio data to hosted movie trailer voting system 135. Alternatively, mobile device 110 may generate digital fingerprints of the audio data and send the digital fingerprints to the hosted movie trailer voting system 135. Alternatively, mobile device 110 may decode an audio encoding of a unique identifier and/or other data, and send a non-audio version of the unique identifier and/or other data to the hosted movie trailer voting system 135. Movie trailer identifier 145 may perform the same operations described with reference to movie trailer identifier 175 to identify a movie trailer. However, movie trailer identifier 145 may compare generated digital fingerprints to other digital fingerprints (or compare a decoded unique identifier to other unique identifiers) of a much larger database of known movie trailers 150B than movie application 170 has access to. The database (or other data store) containing the known movie trailers 150B may include data on a huge selection of known movie trailers, including movie trailers that were shown years or decades in the past. Accordingly, if movie trailer identifier 175 is unable to find a match between a generated digital signature (or decoded unique identifier) and a digital signature (or unique identifier) of known movie trailers 150A, then the generated digital fingerprint(s) (or unique identifier) may be sent to movie application server 132 and compared by movie trailer identifier 145 to the digital fingerprints of known movie trailers 150B. Once movie trailer identifier 145 identifies a match to a movie trailer, movie application server 132 may send information about that identified movie trailer to mobile device 110, including metadata for the movie trailer (e.g., title, date of release of trailer, date of release of associated movie, length of movie trailer, time index for which a match was made, and so on).

Event scheduler 140 identifies users who may want to attend events together and facilitates scheduling of joint attendance of such events for those users. Event scheduler 140 may identify overlapping interest and schedule joint attendance for multiple types of events, including movie showings, plays, comedy shows, sporting events, musicals, and so on. Event scheduler 140 may identify user interest in attending an event from user interest data, which may include user feedback (e.g., user sentiment) about the event associated with user accounts (e.g., such as user accounts of movie application server 132). For example, event scheduler 140 may receive user feedback or sentiment associated with movie trailers, and determine from the user feedback movies that various users want to see. In another example, event scheduler 140 may receive purchase history for movies, sporting events, and so on, and may determine possible user interest in upcoming events based on the purchase history for past events. In another example, event scheduler 140 may receive click through data indicating users who have viewed ticket information for events but have not yet purchased tickets for those events. Other types of information may also be used to determine user interest in attending events. Additionally, combinations of different sources of user interest data may be used to determine user interest in attending events.

Event scheduler 140 additionally determines relationships between user accounts using one or more sources of relationship information. In one embodiment, event scheduler 140 receives address book information from mobile devices 110. Address book data from mobile devices 110 of multiple different users may be compared and/or correlated to identify users who are friends, family and/or acquaintances of other users. For example, a first user account may be associated with a first mobile device that includes a name that matches a user name associated with a second user account. Additionally, the address book of the mobile device associated with the second user account may include an address book that includes a name that matches the user name associated with the first user account. Based on this information, event scheduler 140 may determine that the first user account and second user account are of users that have some relationship to one another.

Some users may specify which other users they like to attend events with. Such declared relationships may also be used to identify possible users to attend events together.

In one embodiment, event scheduler 140 accesses a social network graph or other third party data set of a social network server 125 (or other third party) executing on server computing device 120 to determine relationship information about user accounts and associated users. In one embodiment, the third party data set includes profile information from a social network account of a user of a mobile device 110. Such profile information may be referred to as an online identity. The third party data set may be associated with a user account of a user on movie application server 132 and/or event scheduler 140, and may have been obtained from social network server 125. In one embodiment, the event scheduler 140 maintains a session with the social network server 125 for the social network accounts associated with one or more user accounts of the movie application server 132 and/or event scheduler 140. The event scheduler 140 may periodically or continuously receive status updates for the social network account of the users of the mobile devices 110 via the maintained sessions. Examples of social network services with which sessions may be maintained include LinkedIn®, Facebook®, Google+®, Myspace®, Pinterest®, Twitter®, and so on. Note that other types of third party data sets that are not from social network services may also be used for relationship determination purposes, such as association membership lists (e.g., for professional associations, business groups, Yahoo® groups, etc.), which may be provided by servers associated with the associations.

If the data from the third party data set satisfies a relationship criterion for a pair of user accounts, then event scheduler 140 determines that the pair of user accounts are of users who have a sufficiently close relationship that they might want to attend an event together. Examples of relationship criteria include relationship status between the social network account of a first user and a separate social network account associated with a second user. For example, relationship criteria may be satisfied if the social network account of one user has a "friends" or "family" relationship status with the social network account of the other user.

Once event scheduler 140 identifies two users who both have an interest (e.g., a high likelihood) of attending an event, event scheduler 140 sends messages to devices (e.g., mobile devices 110) of each of the users asking if they are interested in attending the event with the other user. Similarly, event scheduler 140 may identify larger groups of users (e.g., more than two users) who may want to attend an event together, and may separately message each of those users about the possibility of attending the event with the other identified users. If each of the messaged users responds that they are interested in attending the event with the other identified users, then event scheduler 140 may schedule joint attendance of the event for all of the identified users. This may include identifying a date and time of the event and guiding the users through purchase of tickets to the event.

In one embodiment, server computing device 130 further includes an interest notifier 142. Interest notifier 142 aggregates event interest data from multiple user accounts and determines interest levels for events. For events that occur repeatedly, such as movie showings and musical showings, interest notifier 142 may determine separate interest levels for each showing and/or for groups of showings. Interest levels may have varying levels of specificity, and may provide interest by region (e.g., state, county, zip code, city, theater, venue, etc.), time, date, date ranges, day of the week, and so on. For example, interest notifier 142 may determine interest levels for all showings on the same day, all showings on a particular day of the week (e.g., Fridays), all showings for a particular time, all showings for a particular time and day of the week, and so on. Interest levels may be sent to venues (e.g., to movie theaters), to movie studios, and/or to other third parties.

In one embodiment, interest notifier 143 determines a likelihood that a user will attend an event (e.g., will attend a showing of a movie). Interest notifier 142 may determine a likelihood that a user will attend an event based on user feedback and/or other types of interest data. In one embodiment, interest notifier 142 determines a likelihood that a user will attend a showing of a movie based on a user rating or voting of a movie trailer associated with the movie. For example, if a user gave a movie a rating of 5 out of 5, then it may be determined that there is a high likelihood that the user will see the movie. In one embodiment, interest notifier 142 determines a likelihood that a user will attend a showing of a movie based on a combination of user feedback for a trailer associated with the movie (e.g., a user voting or rating of the trailer), user feedback for other movie trailers, and actual user attendance of showings for the movies associated with the other movie trailers. For example, a correlation may be determined between user votes or ratings and actual attendance of movies voted on. In an example, a user may have indicated, based on voting on movie trailers, that they were interested in seeing 10 movies in the past. However, the user may have attended only 8 out of the 10 movies. Accordingly, interest notifier 142 may determine that the user has an 80% chance of attending a movie if that user votes that they want to see an upcoming movie based on their movie voting and attendance record. The likelihood that users will attend movie showings may be included in the reports of interest levels.

Figure 2A:
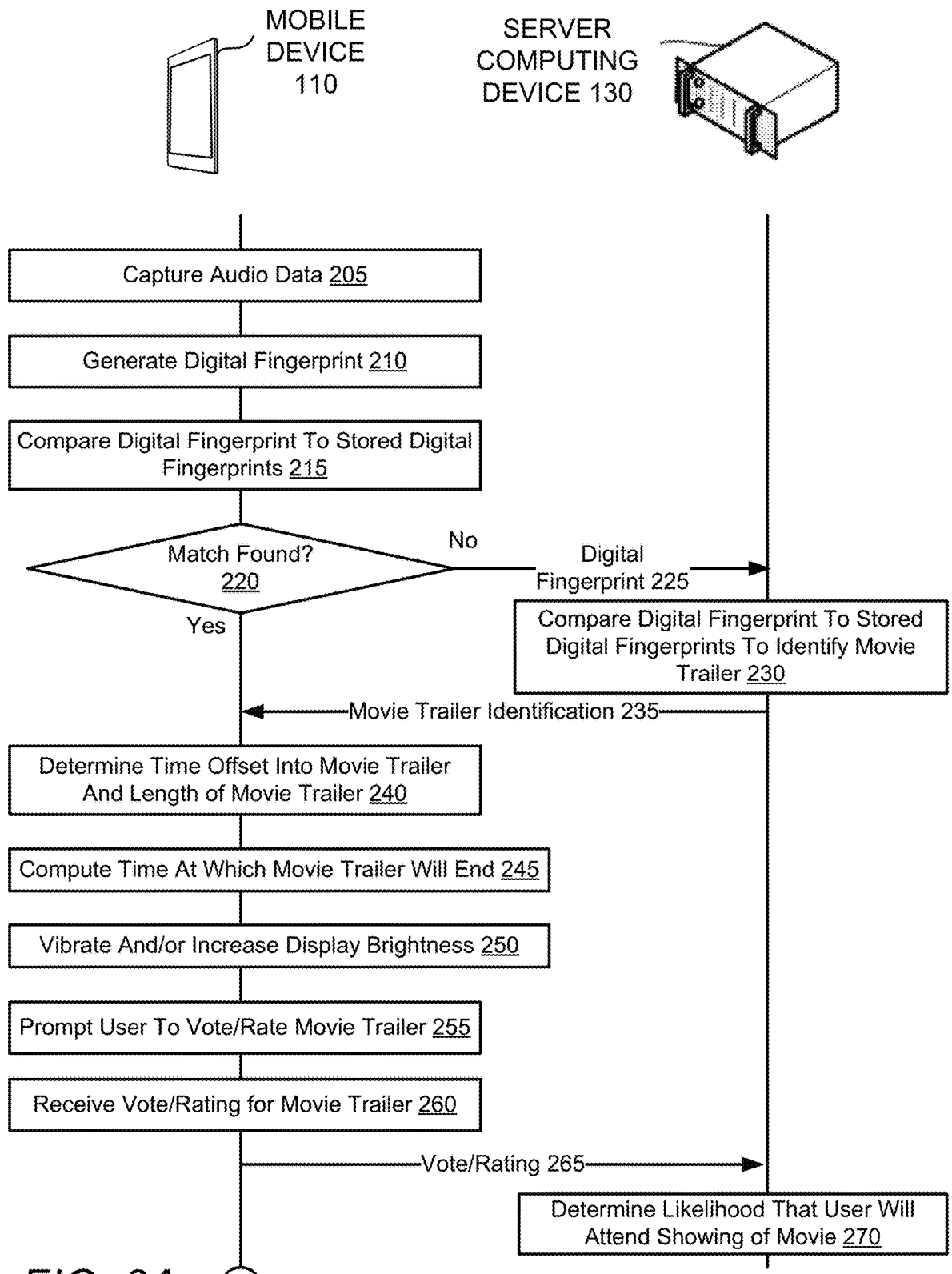
FIGS. 2A-B are sequence diagrams illustrating a movie trailer voting process, according to an embodiment.
Figure 2B:
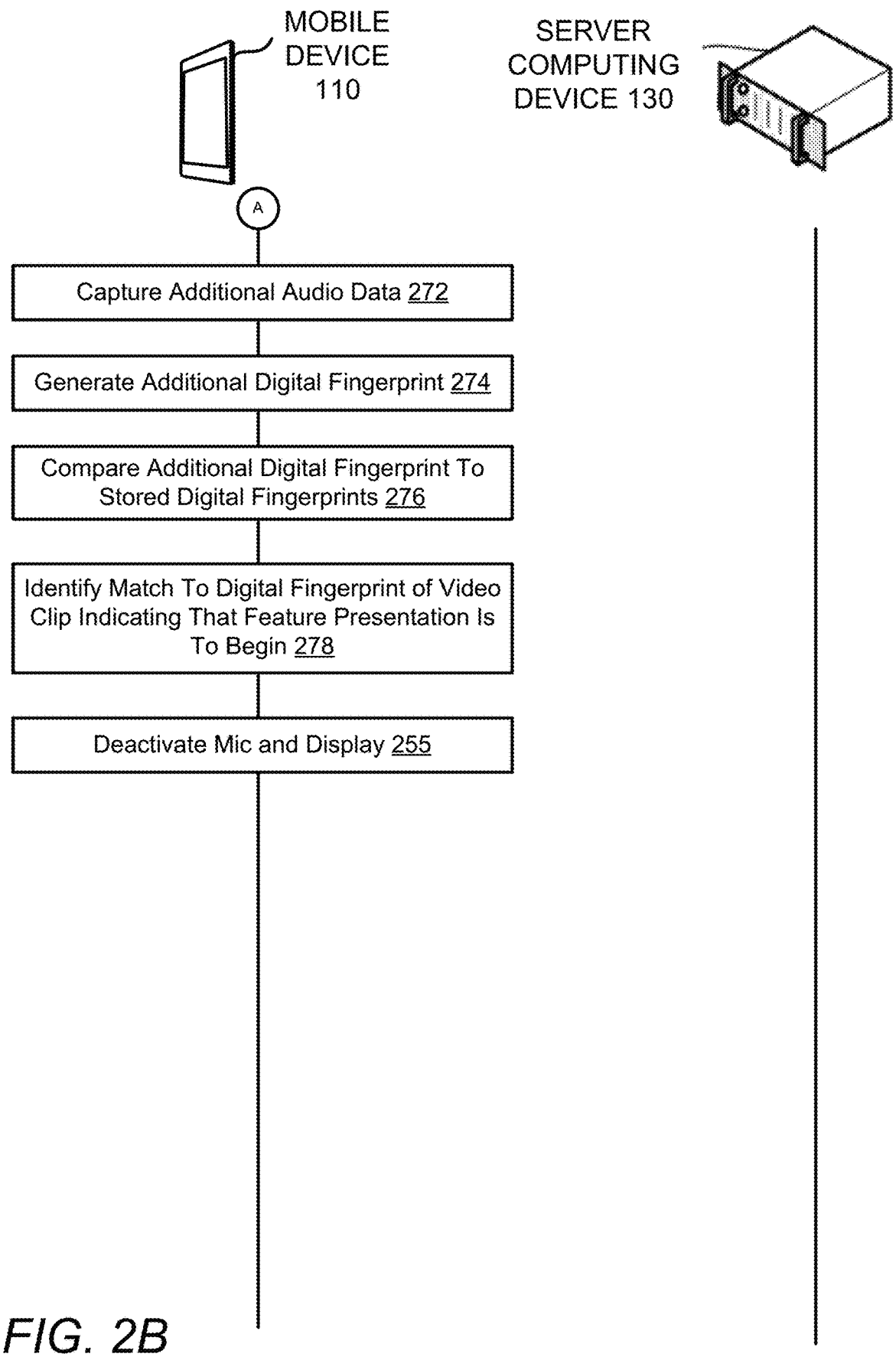

FIGS. 2A-B are sequence diagrams illustrating a movie trailer voting process, according to an embodiment. The sequence diagrams include a mobile device 110 and server computing device 130, each of which may perform one or more operations for the movie trailer voting process. The movie trailer voting process may begin with mobile device 110 capturing audio data at block 205, where the captured audio data includes a sample of an audio track associated with an unknown movie trailer. At block 210, the mobile device 110 generates a digital fingerprint of the captured audio data. In one embodiment, the mobile device 110 generates a digital fingerprint of a portion of the captured audio data.

At block 215, the mobile device 110 compares the digital fingerprint to stored digital fingerprints associated with known movie trailers. At block 220, the mobile device 110 determines whether a match is found between the digital fingerprint and a digital fingerprint of one of the known movie trailers. If no match is found, then the digital fingerprint is sent to server computing device 130 at block 225. Server computing device 130 then compares the digital fingerprint to stored digital fingerprints of a larger selection of known movie trailers to identify the movie trailer at block 230. Server computing device then sends a message to mobile device that includes an identification of the movie trailer that was identified at block 235. The message may further include additional information about the movie trailer, such as a time index in the movie trailer associated with the portion of the movie trailer for which the identification was made and/or a length of the movie trailer.

If a match is found at block 220, or if a message that includes the movie trailer identification is received, then at block 240 the mobile device determines a time offset into the movie trailer and a length of the movie trailer. The time offset may represent a current time position in the playback of the movie trailer. At block 245, the mobile device computes a time at which the movie trailer will end (e.g., by subtracting a time offset associate with the matching digital fingerprint from the length of the movie trailer). Alternatively, the operations of blocks 240 and 245 may be performed by server computing device 130.

At block 250, the mobile device vibrates, increases a display brightness and/or outputs a push notification at the time that the movie trailer was predicted to end. This may draw a user's attention to the mobile device. Alternatively, the mobile device may determine a second time that is within a threshold distance in time from the computed time. The threshold may be, for example, 2-4 seconds from the computed time. For example, the mobile device may vibrate and/or increase a display brightness 2 seconds before the movie trailer ends or 2 seconds after the movie trailer ends. At block 255, the mobile device generates a prompt for the user to vote on and/or rate the movie trailer. In one embodiment, the prompt is output upon identification of the movie trailer. Alternatively, the prompt may be output once the movie trailer ends.

At block 260, the mobile device 110 receives a vote and/or rating for the movie trailer (e.g., receives user sentiment or user feedback). At block 265, the mobile device 110 sends the vote or rating to the server computing device. The mobile device 110 may also store the vote or rating on the movie trailer. In some instances, a user may choose not to vote on or rate a movie trailer. In such an instance, the mobile device 110 may send information that indicates a movie trailer that was viewed but that lacks user feedback. At block 270, the server computing device determines a likelihood that a user will attend a showing of the movie associated with the movie trailer. Alternatively, or additionally, mobile device 110 may determine the likelihood that the user will attend the showing of the movie. User feedback or sentiment itself may indicate the likelihood that the user will attend the movie. Alternatively, the likelihood that the user may attend the movie may be determined based at least in part on the user feedback. A user history may be examined to determine a ratio of a particular user vote or rating to the user attending movies in the past, and this ratio may be used to determine a likelihood that the user will attend the movie associated with the movie trailer based on the vote or rating for that movie trailer. For example, a user may have rated 10 movie trailers with a 1 and not gone to see any of those movies. Accordingly, a 0% chance that the user will attend the movie may be determined from a rating of 1 for the movie trailer. In another example, a user may have rated 10 movie trailers with a 4, and may have attended 9 of those movies. Accordingly, a 90% chance that the user will attend the movie may be determined from a rating of 4 for the movie trailer.

At block 272, the mobile device 110 captures additional audio data. At block 274, the mobile device generates an additional digital fingerprint of the additional audio data. At block 276, the mobile device compares the additional digital fingerprint to stored digital fingerprints of known movie trailers as well as to stored digital fingerprints of clips played by theaters after previews of trailers are finished and before a feature presentation. For example, movie theaters often show clips such as "silence is golden" and "turn off cell phones" prior to showing a feature presentation. At block 278, the mobile device 110 identifies a match between the generated digital fingerprint and a digital fingerprint of a video clip indicating that the feature presentation is about to begin. At block 255, the mobile device may deactivate a microphone of the mobile device and/or a display of the mobile device.

In one embodiment, after detecting the match to the digital fingerprint of the video clip indicating that the feature presentation is about to begin, the mobile device 110 continues to sample audio data until, generate digital fingerprints, and compare the digital fingerprints to digital fingerprints of the introductory clips of known movies until a match is identified. This may enable the feature presentation to be identified and reported to server computing device 130 along with the voting and/or rating for one or more movie trailers. This may enable server computing device 130 to correlate voting/rating of movie trailers with feature presentations as well as user accounts.

Figure 3A:
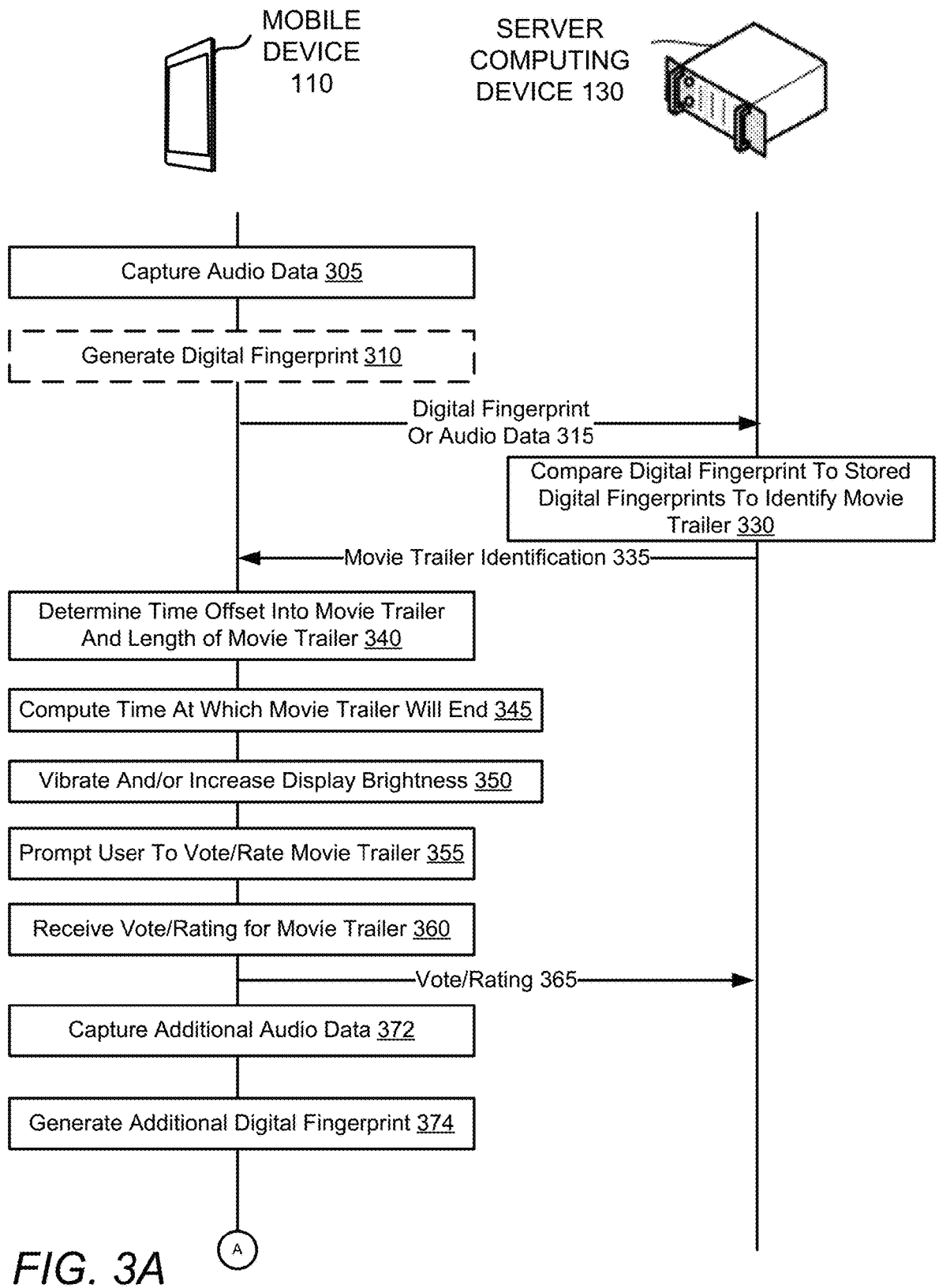
FIGS. 3A-B are sequence diagrams illustrating a movie trailer voting process, according to an embodiment.
Figure 3B:
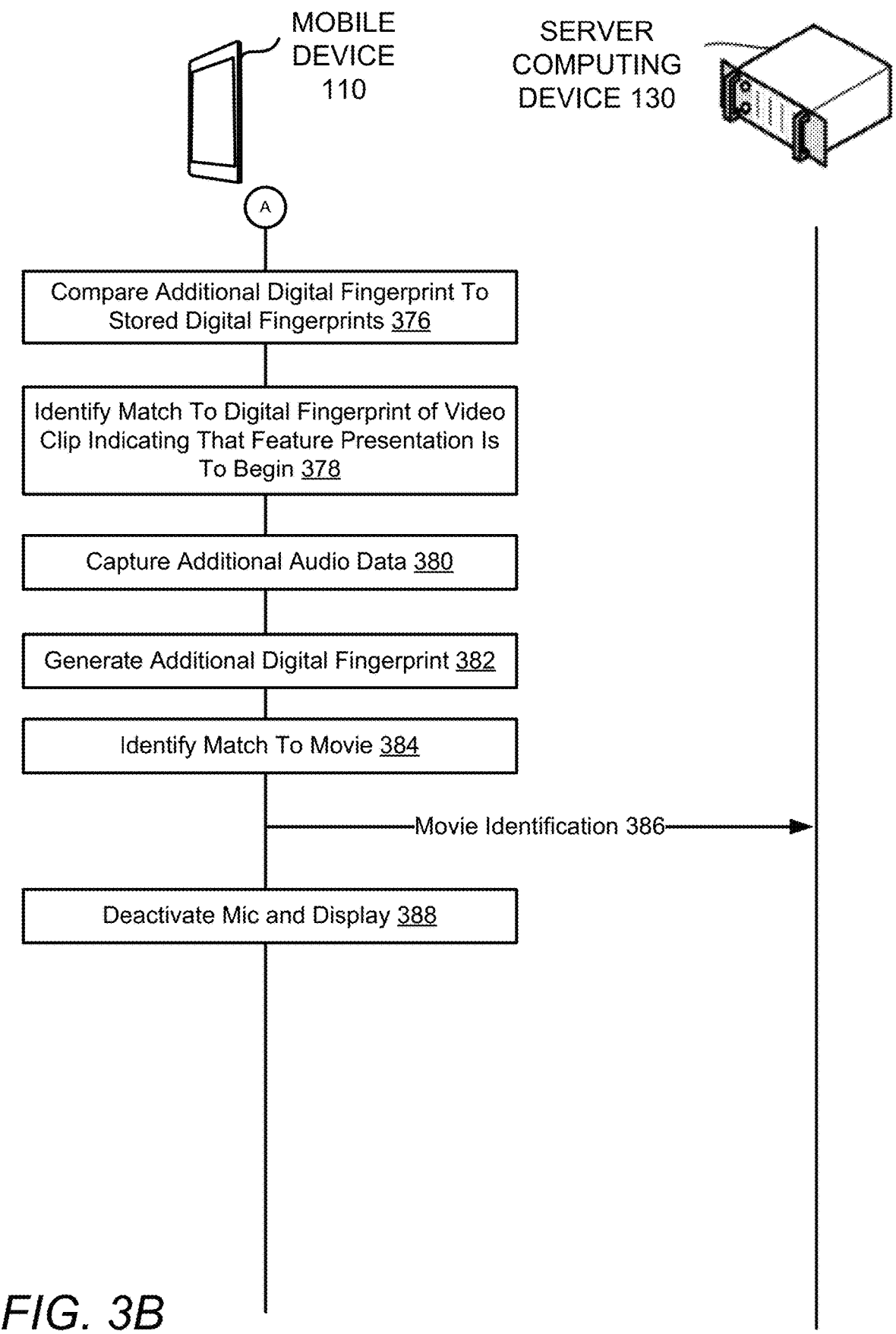

FIGS. 3A-B are sequence diagrams illustrating a movie trailer voting process, according to an embodiment. The sequence diagrams include a mobile device 110 and server computing device 130, each of which may perform one or more operations for the movie trailer voting process. The movie trailer voting process may begin with mobile device 110 capturing audio data at block 305, where the captured audio data includes a sample of an audio track associated with an unknown movie trailer. At block 310, the mobile device 110 may generate a digital fingerprint of the captured audio data. In one embodiment, the mobile device 110 generates digital fingerprints of one or more portions of the captured audio data.

At block 315, mobile device 110 sends the captured audio data or one or more digital fingerprints of the captured audio data to server computing device 130. Server computing device 130 then compares the one or more digital fingerprints to stored digital fingerprints of known movie trailers to identify the movie trailer at block 330. Server computing device then sends a message to mobile device that includes an identification of the movie trailer that was identified at block 335. The message may further include additional information about the movie trailer, such as a time index in the movie trailer associated with the portion of the movie trailer for which the identification was made and/or a length of the movie trailer.

At block 340, the mobile device determines a time offset into the movie trailer and a length of the movie trailer. The time offset may represent a current time position in the playback of the movie trailer. At block 345, the mobile device computes a time at which the movie trailer will end. Alternatively, the operations of blocks 340 and 345 may be performed by server computing device 130.

At block 350, the mobile device vibrates, increases a display brightness and/or outputs a push notification at the time that the movie trailer was predicted to end. This may draw a user's attention to the mobile device. In some embodiments, the mobile device may be paired with a wearable device or other mobile device (e.g., such as a smart watch). The wearable device may have its own display, which may be a touch display. In such an instance, the mobile device may send an instruction to the wearable device or other mobile device to cause that device to vibrate, increase display brightness, etc. The wearable device or other mobile device may then vibrate, increase display brightness, etc. in addition to or instead of the mobile device. At block 355, the mobile device generates a prompt for the user to vote on and/or rate the movie trailer. In one embodiment, the prompt is output upon identification of the movie trailer. Alternatively, the prompt may be output once the movie trailer ends. In one embodiment, in which the mobile device is paired with a wearable device or other mobile device, the wearable device or other mobile device outputs the prompt instead of or in addition to the mobile device.

At block 360, the mobile device 110 receives user feedback such as a vote and/or rating for the movie trailer. In one embodiment, in which the mobile device is paired with a wearable device or other mobile device, the wearable device or other mobile device receives the user feedback and sends the user feedback to the mobile device. At block 365, the mobile device 110 sends the user feedback to the server computing device.

At block 372, the mobile device 110 captures additional audio data. At block 374, the mobile device generates one or more additional digital fingerprints of the additional audio data. At block 376, the mobile device compares the one or more additional digital fingerprints to stored digital fingerprints of known movie trailers as well as to stored digital fingerprints of clips played by theaters after previews of trailers are finished and before a feature presentation. Alternatively, mobile device 110 may send the digital fingerprints to server computing device 130 for comparison to stored digital fingerprints of movies. At block 378, the mobile device 110 identifies a match between the generated digital fingerprint and a digital fingerprint of a video clip indicating that the feature presentation is about to begin. Alternatively, the match may be identified by server computing device 130, after which server computing device 130 may send an instruction to mobile device 110 indicating that the feature presentation is about to begin.

At block 380, mobile device 110 captures additional audio data. At block 382, mobile device 110 generates one or more additional digital fingerprints of the additional audio data. At block 384, the mobile device identifies a match to the feature presentation. This may include comparing the generated digital fingerprints of the feature presentation to stored digital fingerprints of the introductory scenes of multiple known movies. In one embodiment, mobile device 110 sends the audio data and/or digital fingerprints to server computing device 130, and server computing device 130 makes the comparison and determines the match. Alternatively, mobile device 110 may make the comparison and determine the match, after which mobile device 110 may report the identified movie to server computing device 130 at block 386. At block 388, the mobile device may deactivate a microphone of the mobile device and/or a display of the mobile device.

Figure 3C:
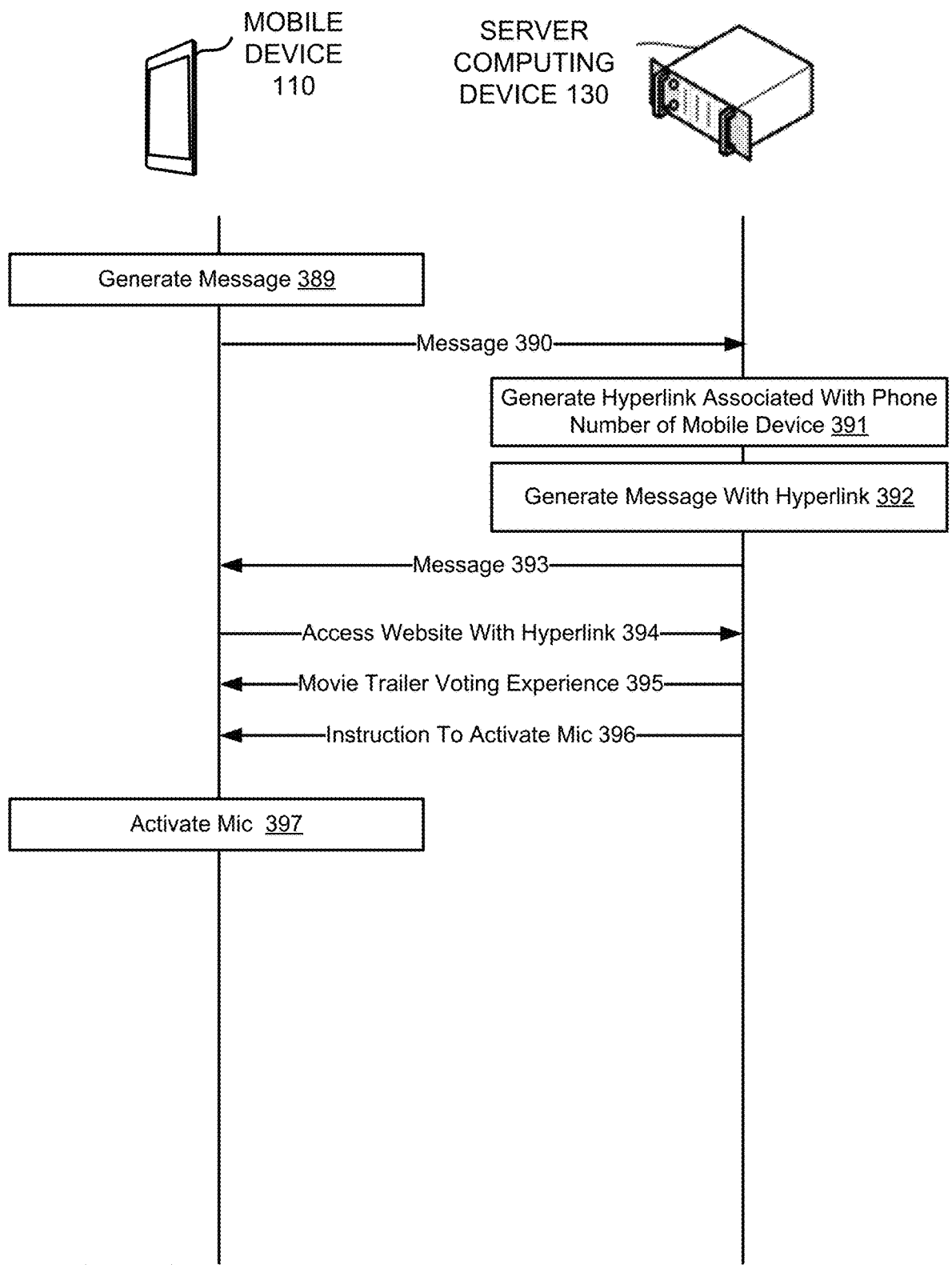
FIG. 3C is a sequence diagram illustrating the use of a mobile website for movie trailer voting, according to an embodiment.

FIG. 3C is a sequence diagram illustrating the use of a mobile website for movie trailer voting, according to an embodiment. The sequence diagram includes a mobile device 110 and server computing device 130, each of which may perform one or more operations for the movie trailer voting process. The process illustrated in FIG. 3C may be performed prior to the processes illustrated in one or more of FIGS. 2A-B, FIGS. 3A-B and/or FIGS. 4A-C in embodiments.

At block 389, mobile device 110 generates a message. The message may be generated on the mobile device by a user in response to a clip played at a movie theater directing users to send a particular message to a particular phone number if they want to vote on or rate movie trailers. At block 390, the mobile device 110 sends the message to the server computing device 130. The message may be, for example, an SMS or MMS message to a phone number associated with the server computing device 130.

At block 391, the server computing device 130 generates a hyperlink (or other link) associated with the phone number of the mobile device. In one embodiment, the hyperlink includes a hash of a phone number of the mobile device 110. At block 392, the server computing device 130 generates a message that includes the generated link (e.g., the generated hyperlink). At block 393, the server computing device sends the generated message to the mobile device 110. In one embodiment, the message sent at block 393 is sent using a same messaging protocol as the message sent at block 390. Alternatively, different messaging protocols may be used.

At block 394, the mobile device 110 executes a web browser and accesses a movie trailer voting website using the hyperlink (or other link) provided in the message received by mobile computing device 110. At block 395, the server computing device downloads content to the mobile device 110 that enables a movie trailer voting experience. This may include downloading one or more hypertext markup language (HTML) pages, one or more cascading style sheets (CSS) and/or one or more scripts (e.g., JavaScript scripts). At block 396, the server computing device 130 may additionally send an instruction to activate a microphone of the mobile device 110. At block 397, the mobile device 110 activates the microphone. This may be performed after providing a prompt asking for permission to use the microphone, and receiving authorization to use the microphone. The operations described with FIGS. 2A-2B and/or 3A-3B may then be performed to enable a user to vote on one or more movie trailers.

Figure 4A:
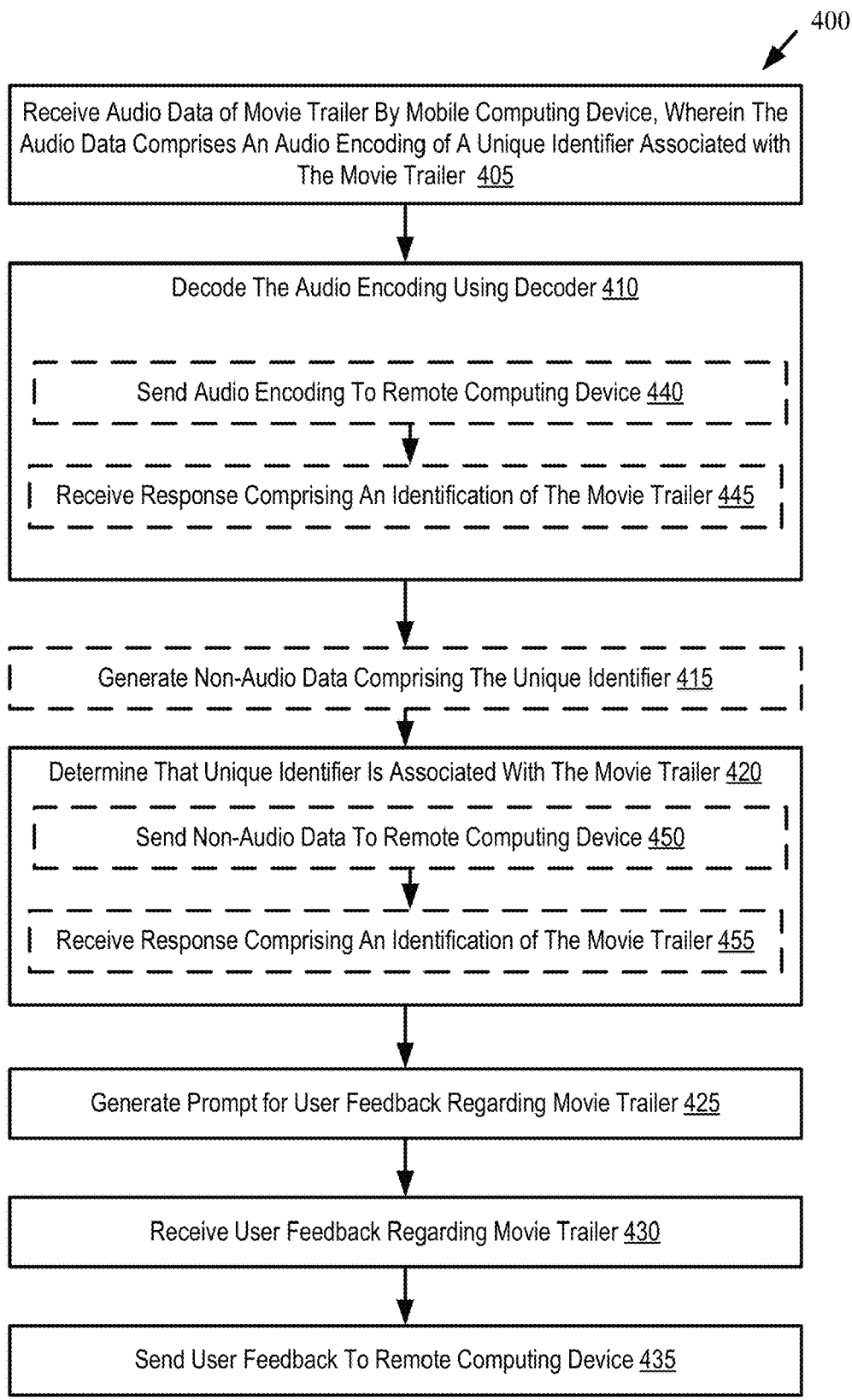
FIG. 4A is a flow diagram illustrating a method of identifying a movie trailer from an audio encoding and providing a movie trailer feedback experience for the movie trailer, according to an embodiment.
Figure 4B:
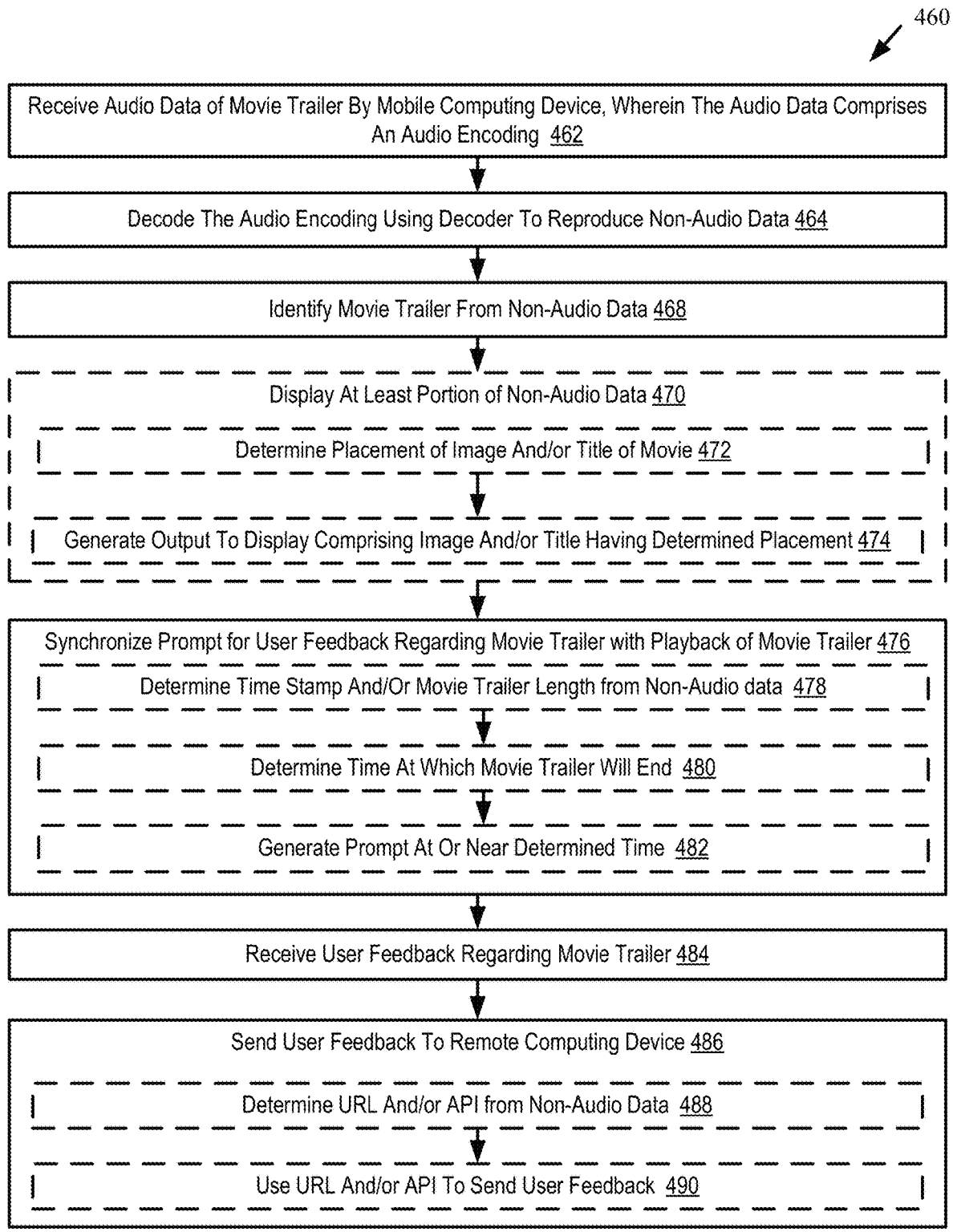
FIG. 4B a flow diagram illustrating a method of identifying a movie trailer from an audio encoding and providing a movie trailer feedback experience for the movie trailer, according to an embodiment.
Figure 4C:
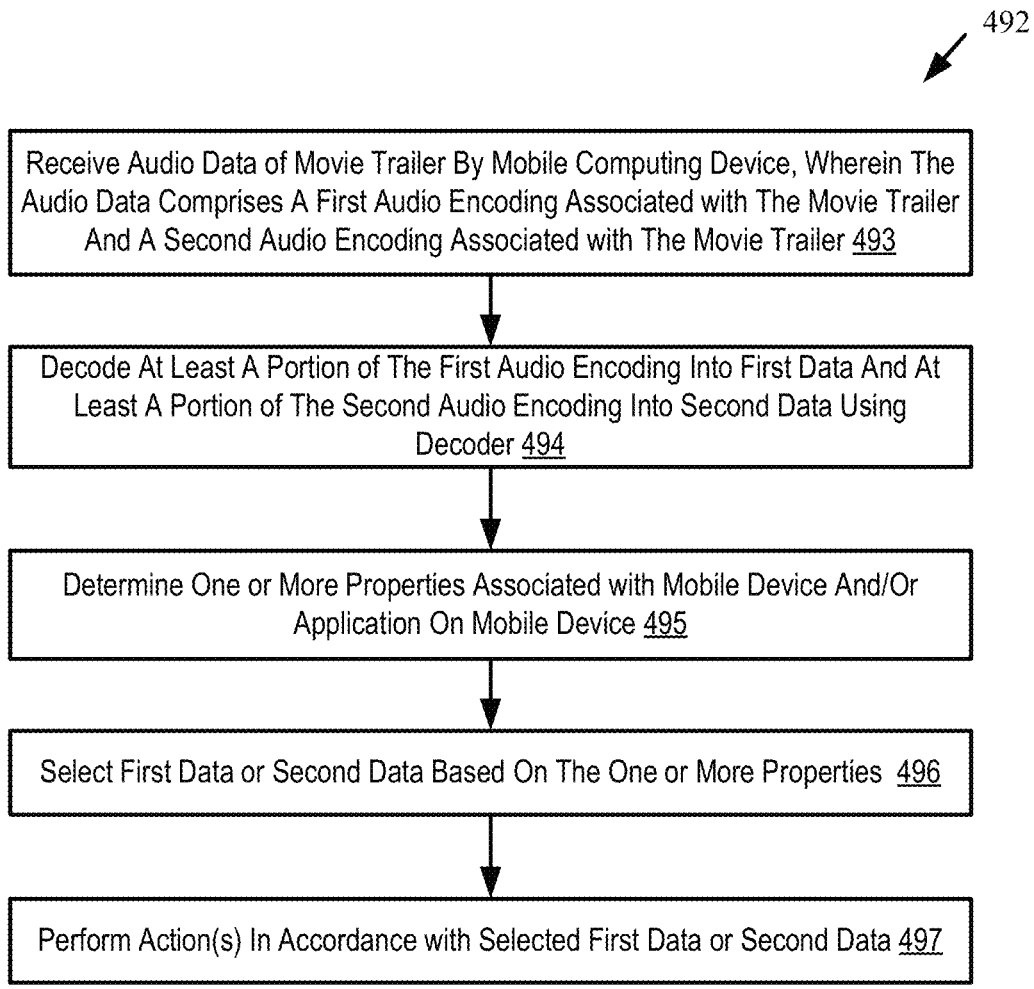
FIG. 4C a flow diagram illustrating a method of identifying a movie trailer from an audio encoding and providing a movie trailer feedback experience for the movie trailer, according to an embodiment.

FIGS. 4A-C are a flow diagrams illustrating methods 400, 460, 492 of identifying a movie trailer from an audio encoding and providing a movie trailer feedback experience (e.g., a movie trailer voting experience) for the movie trailer, according to embodiments of the present disclosure. Methods 400, 460, 492 may be performed by processing logic that comprises hardware (e.g., circuitry, dedicated logic, programmable logic, microcode, etc.), software (e.g., instructions run on a processor), firmware, or a combination thereof. Aspects of the methods 400, 460, 492 may be performed, for example, by mobile device 110 and/or server computing device 130 of FIG. 1 in embodiments. FIGS. 4A-C are discussed with reference to one or more audio encodings. For example, a movie trailer may be associated with a first audio encoding, a second audio encoding, a third audio encoding, and so on. The various audio encodings may be separate and distinct audio encodings (e.g., separate and distinct audio watermarks that are played in parallel or that are alternately played) or may be portions or aspects of a single audio encoding (e.g., may be portions of a single audio watermark).

Referring to FIG. 4A, at block 405 of method 400, a mobile computing device (e.g., mobile device 110 of FIG. 1) receives audio data of a movie trailer. The mobile computing device may execute a movie application (e.g., movie application 170) or may access a hosted movie trailer voting system (e.g., a movie trailer voting/rating website) using a mobile web browser, as discussed elsewhere herein. The received audio data comprises an audio encoding of a unique identifier associated with the movie trailer and/or of other data associated with the movie trailer. The audio encoding may be, for example, an audio watermark that is embedded in an audio signal of the movie trailer. The audio encoding of the unique identifier and/or other data may not be audible to humans (e.g., may be encoded into an ultrasonic audio frequency). The unique identifier and/or other data may have been encoded into an audio format using one or more audio modulation schemes such as frequency shift keying, phase shift keying, pulse modulation, and so on. In one embodiment, the audio encoding is an audio watermark generated using spread spectrum audio watermarking (SSW).

At block 410, the audio encoding is decoded using a decoder. The decoder may include the same encoding/decoding scheme that was used to encode the audio encoding of the unique identifier and/or other data. Accordingly, the decoder may process the audio data for decoding and then generate non-audio data comprising the unique identifier and/or other data at block 415 using the same one or more audio modulation schemes that were used to encode the unique identifier and/or other data into the audio encoding. The non-audio data may be text data, numerical data, alphanumeric data, binary data, image data, and so on.

In one embodiment, the decoder is on the mobile device, and the mobile device performs the decoding of the audio encoding. In another embodiment, the decoder is on a remote computing device (e.g., included in movie application server 132 running on server computing device 130). In such an embodiment, the mobile device may send the audio data (or a portion of the audio data such as the audio encoding) to the remote computing device. The remote computing device may perform the decoding and send the non-audio data comprising the unique identifier and/or other information to the mobile device. Alternatively, or additionally, the remote computing device may send other data associated with the movie trailer, such as a name, length, version, images, etc. of the movie trailer.

At block 420, processing logic determines that the unique identifier is associated with the movie trailer. This may include identifying the specific movie trailer that is playing based on the unique identifier (e.g., based on the non-audio version of the unique identifier). For example, the mobile device may compare the unique identifier to a stored list of unique identifiers, where each of the unique identifiers in the list is associated with a particular movie trailer. Processing logic may identify a match between the unique identifier that was included in the audio data and a stored unique identifier associated with a known movie trailer, and may identify the playing movie trailer as the known movie trailer based on the match. The mobile device may store information such as a length of the movie trailer, the name of the movie trailer, images associated with the movie trailer, and so on, and may display such data.

In one embodiment, the mobile device sends the non-audio data (e.g., the non-audio version of the unique identifier) to the remote computing device for identification. For example, the mobile device may not attempt identification locally, or may compare the decoded unique identifier to stored unique identifiers but fail to find a match. In either instance, the remote computing device may compare the unique identifier to a list of unique identifiers stored at the remote computing device to find a matching stored unique identifier and identify the movie trailer. At block 455, the mobile device may receive a response from the remote computing device that comprises an identification of the movie trailer. The response may additionally include other information associated with the movie trailer such as the length, title, images, etc. for the movie trailer.

At block 425, the mobile device generates a prompt for user feedback regarding the movie trailer. This may include performing at least one of displaying the prompt, vibrating or increasing a brightness of a display of the mobile computing device at or around a time that the movie trailer will end (e.g., at a first time when the movie trailer ends or at a second time that is within a threshold distance in time from the first time). If a wearable device is paired with the mobile device, the mobile device may send a command to the wearable device causing the wearable device to display a second prompt for user feedback, vibrate and/or increase a brightness of a second display of the wearable device at or around the time that the movie trailer ends. At block 430, the mobile device receives user feedback (e.g., a vote and/or rating of the movie trailer) based on user input.

At block 435, the mobile device sends the user feedback to a remote computing device (e.g., to the server computing device 130). For example, the mobile device may include a network connection, and may send the user feedback to the remote computing device over the network connection. The user feedback may have a size of about 1 kb or less in embodiments.

In some instances the mobile computing device may not have a network connection (e.g., the mobile computing device may have low signal strength and may not include a data connection to a first wireless carrier). However, other nearby mobile computing device may have a network connection (e.g., may have a higher signal strength and may have a data connection to a second wireless carrier). In such instances, processing logic may identify an additional mobile computing device also executing a movie application before or after determining that the mobile computing device lacks a network connection. Processing logic may establish a peer-to-peer connection with the nearby mobile computing device that may be executing the same movie application as the mobile computing device. Processing logic may then send the user feedback to the second mobile computing device along with a request for the second mobile computing device to forward the user feedback on to the remote computing device. The second mobile computing device may then forward the message to the remote computing device over the network connection of the second mobile computing device.

In one embodiment, the audio encoding comprising the unique identifier is included in the audio for the movie trailer at a beginning of the movie trailer. Accordingly, when the unique identifier is identified from a playback at a particular first time stamp, a second time stamp at which the movie trailer will end may be determined by adding the length of the movie trailer to the first time stamp.

In one embodiment, different audio encodings comprising different unique identifiers (or the same unique identifier plus a different timestamp) are included in the audio for the movie trailer at different time offsets in the movie trailer. Accordingly, when a unique identifier associated with a particular time offset in the movie trailer is identified at a first time stamp, an amount of time between the particular time offset and a total length of the movie trailer may be computed. Alternatively, when a timestamp is decoded from the audio encoding, the particular time offset of the movie trailer may be identified. The computed amount of time may then be added to the first time stamp to determine a second time stamp at which the movie trailer will end. Alternatively, the timestamp included in the audio encoding may be a time stamp that includes an amount of time left in the movie trailer instead of or in addition to the amount of time already played in the movie trailer.

The operations of method 400 may be repeated for multiple different movie trailers in a sequence of movie trailers. Eventually, a video clip that indicates a feature presentation is to begin may be played. An audio encoding of another unique identifier may be included in audio data of the video clip. The audio data may be received, and the mobile device may decode the audio encoding from the audio data and then identify the other unique identifier. The other unique identifier may be compared to the list of stored unique identifiers to determine that the video clip indicates that the feature presentation is to begin. Processing logic may then deactivate the display of the mobile device and/or the microphone of the mobile device.

The operations of method 400 may be performed by a movie application running on the mobile device or by a movie trailer voting/rating website provided by a hosted movie trailer voting system. If the mobile device does not include a movie application that provides a movie trailer voting/rating experience, then the mobile device may send a text message to a phone number (e.g., which may be shown in a video clip prior to showing of the movie trailers). Responsive to sending the text message, the mobile device may receive a response message comprising a link to a website. The mobile device may access the website via a web browser of the mobile device using the link, and may then receive a movie trailer voting/rating experience. This may include receiving an instruction from the website to activate a microphone of the mobile device and activating the microphone.

Referring to FIG. 4B, at block 462 of method 460 a mobile computing device receives audio data of a movie trailer. The received audio data includes an audio encoding associated with the movie trailer (e.g., an audio watermark). The audio encoding may include encodings of multiple different types of information. Examples of other types of data that may be encoded into an audio encoding include metadata such as a movie title, a movie studio name, a movie show time date, a location, a movie theater identification, an identifier of a room of a movie theater, a version of a movie trailer, a movie identifier, a URL, an API, internationalized strings, actor information, director information, producer information, studio information, genre, movie trailer length, a timestamp of a time offset into the movie trailer, and so on. Other example of types of data that may be encoded into the audio encoding include rich content such as a soundtrack (e.g., for a particular region), one or more images (e.g., an image of a movie poster for the movie associated with the movie trailer, images to use for voting buttons, images to use for a background, screen shots of the movie, etc.), one or more video clips and/or animated images (e.g., an animated GIF file), and so on.

At block 464, processing logic of the mobile computing device decodes the audio encoding using a decoder to reproduce non-audio data. The non-audio data comprises a copy of the data that was originally encoded into the audio encoding using an encoder.

At block 468, the processing logic identifies the movie trailer from the non-audio data. In some embodiments, the mobile computing device contains a data store comprising information about current movie trailers. In such an embodiment, the non-audio data may simply comprise a unique identifier for the movie trailer, and processing logic may identify the movie trailer by comparing the unique identifier with a list of unique identifiers for stored known movie trailers and finding a match. Once the movie trailer is identified, processing logic may then use stored information associated with that movie trailer (e.g., such as stored graphics information, movie trailer length, movie trailer title, and so on) to present a movie trailer feedback experience on the mobile computing device.

In some embodiments, the mobile computing device may not contain information about the movie trailer. Additionally, the mobile computing device may or may not have network access. The non-audio data may include all of the information that is to be used to identify the movie trailer and provide the movie trailer feedback experience.

In one embodiment, at block 470 processing logic displays at least a portion of the non-audio data on a display of the mobile computing device. For example, the non-audio data may include one or more images (e.g., an image of a movie poster, images for one or more buttons to display, a background color or image, etc.), one or more strings (e.g., containing a movie title, actor information, director information, franchise information, genre information, release data, etc.), font information, layout information (e.g., layout expressed in a markup language such as hypertext markup language (HTML) or Xamarin), and so on. Processing logic may use default configuration settings to display one or more of the strings (e.g., the movie title) and/or the images (e.g. the movie poster).

In one embodiment, the non-audio data includes layout information. Accordingly, at block 472 processing logic may determine a placement of one or more images and/or one or more strings (e.g., the movie title) from the layout information. At block 472, processing logic may generate (e.g., render) an output to a display of the mobile computing device. The rendering/output may include the image and/or string(s) having the predetermined placement.

At block 476, processing logic synchronizes a prompt for user feedback regarding the movie trailer with playback of the movie trailer. In some embodiments, the non-audio data includes a timestamp indicating a time offset into the movie trailer associated with the non-audio data. The timestamp may indicate a time from a start of the movie trailer and/or a time from an end of the movie trailer. Additionally, the non-audio data may include a length of the movie trailer. Different audio encodings may be output during playback of a movie trailer at different times. For example, audio encodings may be output on a periodic bases such as every 5 seconds, every 10 seconds, every 12 seconds, every 15 seconds, every 20 seconds, every 30 seconds, every minute, etc. The different audio encodings may include the same movie title string, the same language setting, the same movie poster image, and so on, but may include a different timestamp. A particular received and decoded audio encoding may be processed to determine a timestamp associated with that audio encoding.

Accordingly, at block 478 processing logic may determine the timestamp and/or the movie trailer length from the non-audio data. At block 480, processing logic may determine a time at which the movie trailer will end. If the timestamp indicates a time offset from a start of the movie trailer, then the time at which the movie trailer will end may be computed by subtracting the timestamp from the length of the movie trailer. If the timestamp indicates a time to completion, then no computation may be performed to determine the time at which the movie trailer will end. At block 482, processing logic may generate the prompt at or near the determined time. For example, processing logic may provide the prompt at the time that the movie trailer ends or at a second time that is within a threshold distance in time from the time at which the movie trailer will end. In some embodiments, processing logic generates the prompt responsive to identifying the movie trailer. However, processing logic may perform additional operations at or around the time that the movie trailer ends to call a user's attention to the display of his mobile computing device so that the user provides user feedback at that time. For example, processing logic may brighten the display and/or cause the mobile computing device to vibrate. In each of these scenarios, the user feedback experience is synchronized to the playback of the movie trailer.

In some embodiments, the different audio encodings output at the different time offsets into the movie trailer have other minor differences in addition to having different time stamps. For example, in one embodiment different audio encodings have different audio encoded images. The different images may be portions of a larger image that may be combined over time to assemble the larger image. For example, the different images may be puzzle pieces that are connected together over time to form the larger image. In another example, the images may be different images of the same object with at least one changing aspect. As the periodic audio encodings are decoded, a previous image from a previous audio encoding may be replaced with a new image from a current audio encoding. Accordingly, it may appear that an object is moving or changing shape from the changing images (e.g., such as with an animated GIF).

At block 484, processing logic receives user feedback regarding the movie trailer. For example, the user may select a rating or voting button, may swipe left or right on the touch-sensitive display of the mobile computing device, and so on.

At block 486, processing logic may send the user feedback to a remote computing device. The remote computing device may be, for example, server computing device 130 of FIG. 1. Alternatively, or additionally, the remote computing device may be a computing device on a movie theater premises. For example, the remote computing device may be or include a computing device that controls a digital projector that projects the movie trailer and/or a local server computing device.

For example, the mobile device may include a network connection, and may send the user feedback to the remote computing device over the network connection. The user feedback may have a size of about 1 kb or less in embodiments.

In some instances the mobile computing device may not have a network connection (e.g., the mobile computing device may have low signal strength and may not include a data connection to a first wireless carrier). However, other nearby mobile computing device may have a network connection (e.g., may have a higher signal strength and may have a data connection to a second wireless carrier). In such instances, processing logic may identify an additional mobile computing device also executing a movie trailer voting application before or after determining that the mobile computing device lacks a network connection. Processing logic may establish a peer-to-peer connection with the nearby mobile computing device that may be executing the same movie application as the mobile computing device. Processing logic may then send the user feedback to the second mobile computing device along with a request for the second mobile computing device to forward the user feedback on to the remote computing device.

In some embodiments, the non-audio data that was reproduced from the audio encoding includes a URL and/or an API. The URL and/or API may have been linked to one or more images also included in the non-audio data and/or one or more default images. For example, the URL and/or API may be linked to a voting button, and responsive to a press of the voting button the associated URL may be accessed to send voting information. A linked API may be used to access the server at the end of the URL in embodiments. In one embodiment, processing logic determines a URL and/or API from the non-audio data. At block 490, processing logic then uses the URL and/or API to send the user feedback to the remote computing device.

In some embodiments, different user feedback options are associated with different URLs and/or different APIs. For example, if instead of a movie trailer a pre-movie advertisement for an automobile is shown, a test drive button and associated image may be included in the audio encoding, and may be reproduced responsive to decoding the audio encoding. User feedback may include a user clicking on the test drive button, which may send a request for a dealer to call a phone number linked to the mobile computing device to set up a test drive. The request may be sent via the URL and/or API associated with the test drive button.

In embodiments, the audio encoding associated with the movie trailer (or other video clip or still image advertisement) includes all of the information necessary to provide a user feedback experience (e.g., an entire payload). For example, the audio encoding may include audio encoded data including one or more images, one or more text strings, font information, layout information, one or more URLs, one or more APIs, and so on. Accordingly, the application running on the mobile computing device may decode the audio encoding, render a screen for display on the remote computing device, receive user input, and store or send the user input all based on information decoded from the audio encoding. Thus, the mobile device may provide the movie trailer voting experience without having preloaded data and without contacting a remote computing device.

In some embodiments, at least some of the information included in the audio encoding (which becomes decoded into the non-audio data) is information not directly associated with the movie trailer. For example, decoded non-audio data may include an identifier of a movie theater chain, an identifier of a particular location, an identifier of a movie trailer theater room, and so on. The decoded non-audio data may additionally include advertisements, coupons, etc. associated with the movie theater chain, the particular location, and so on. For example, a coupon for one or more restaurants nearby the particular location may be included in the non-audio data, and may be displayed on the mobile computing device.

In some embodiments, the mobile computing device is located in a room of a theater. In other embodiments, the mobile computing device is located at another location, such as at a user's home. If the mobile computing device is located at a user's home, then a computing device presenting a movie trailer and/or a smart television presenting the movie trailer may be linked to a user account. In such embodiments, the audio encoding for the movie trailer may be tailored for the user, and may include an audio encoding of one or more keys that are associated with the user account. The mobile computing device may decode the audio encoding to reproduce the one or more keys, and may access data, offers, etc. tailored for the user using the one or more keys.

Referring to FIG. 4C, at block 493 of method 492 a mobile computing device receives audio data of a movie trailer. The audio data may include multiple different audio encodings. For example, the audio data may include at least a first audio encoding associated with the movie trailer and a second audio encoding associated with the movie trailer. The first audio encoding and the second audio encoding may include different information associated with the movie trailer. For example, the first audio encoding may include strings in French and the second audio encoding may include strings in English. In another example, the first audio encoding may include an image, a layout, a string, etc. associated with a first movie theater company (e.g., Cinemark) and a second audio encoding may include an image, a layout, a string, etc. associated with a second movie theater component (e.g., AMC). Alternatively, or additionally, a single audio encoding may include multiple different pieces of information, some of which will be used if first criteria are met and others of which will be used of second criteria are met.

At block 494, processing logic decodes at least a portion of the first audio encoding into first data and at least a portion of the second audio encoding into second data using a decoder. At block 495, processing logic determines one or more properties associated with the mobile computing device and/or an application running on the computing device. For example, the properties may include a language setting of the mobile device, a current location of the mobile device, a branding of the movie application (e.g., whether the application is branded as a Cinemark application or an AMC application), and so on.

At block 496, processing logic selects the first data or the second data based on the one or more properties associated with the mobile device and/or the application. For example, if the first data includes English language strings, the second data includes French language strings, and the mobile device is in North America or has an English language setting, then the first data may be selected. However, if the mobile device is in France or has a French language setting, then the second data may be selected. In another example, if the first data includes data associated with AMC (e.g., a first layout, first images, first buttons, first colors, first fonts, first sounds, etc.) and the second data includes data associated with Cinemark (e.g., a second layout, second images, second buttons, second colors, second fonts, second sounds, etc.), and the mobile device is in an AMC theater, then the first data may be selected. However, if the mobile device is in a Cinemark theater, then the second data may be selected.

At block 497, processing logic performs one or more actions in accordance with the selected first or second data. For example, the actions may include presenting the first data or the second data. Alternatively, or additionally, if the first data or second data includes particular audio, then performing the actions may include playing the particular audio. In another example, different branding and/or a different experience may be provided based on whether the first data or the second data was selected. In embodiments, first data may include a first URL and/or first API, and second data may include a second URL and/or a second API. Accordingly, performing the actions may include accessing an appropriate URL and/or using an appropriate API.

Figure 5:
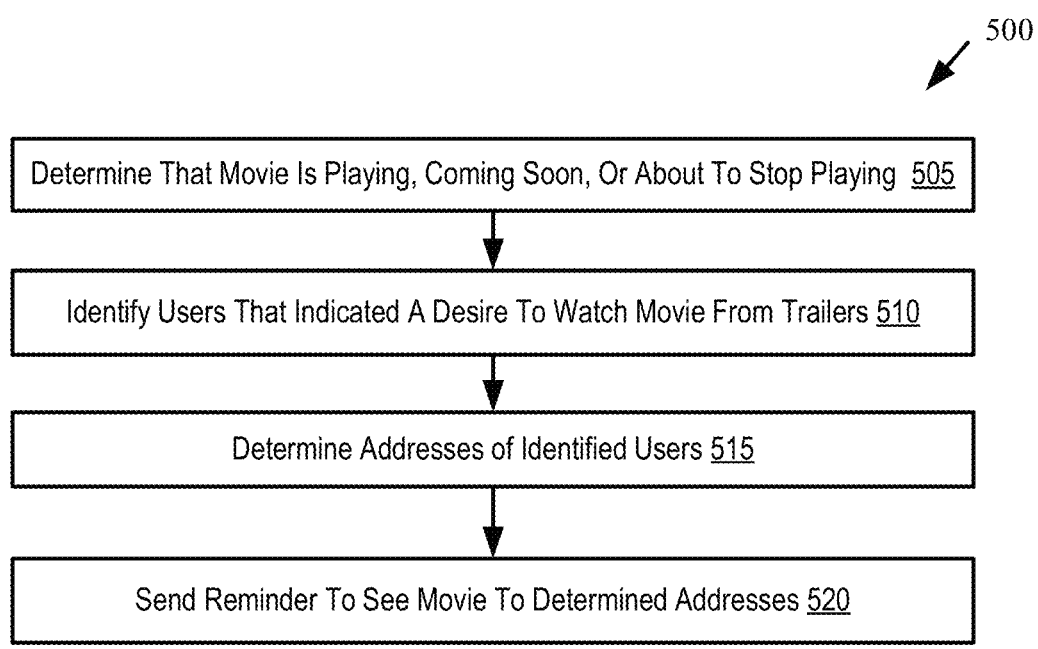
FIG. 5 is a flow diagram illustrating a method of reminding users to view a movie, according to an embodiment.

FIG. 5 is a flow diagram illustrating a method 500 of reminding users to view a movie, according to an embodiment. Method 500 may be performed by processing logic that comprises hardware (e.g., circuitry, dedicated logic, programmable logic, microcode, etc.), software (e.g., instructions run on a processor), firmware, or a combination thereof. The method 500 may be performed, for example by server computing device 130 of FIG. 1 in embodiments.

After a user has provided user feedback that indicates that the user is interested in watching a movie based on a movie trailer viewed by the user, that user may forget about the movie. Processing logic may determine from the user feedback that the user has a high likelihood of attending a showing of the movie. A high likelihood may be determined if a chance of the user viewing the movie is greater than a threshold. The threshold may be, for example, 50%, 60%, 70%, 80%, and so on. Accordingly, in embodiments positive user feedback indicative that a user would like to watch a movie is stored and later used to send reminders to the user to watch the movie.

In one embodiment, at block 505 of method 500 processing logic determines that a movie is playing, coming soon, or about to stop playing. At block 510, processing logic identifies a set of users who indicated a desire to watch the movie from viewing movie trailers associated with the movie and voting on those movie trailers. Alternatively, or additionally, processing logic may predict that a user might want to watch a movie based on their votes on other movies. For example, if a user voted in the past that they wanted to watch each of the Marvel® movies that were coming out, then a determination may be made that the user might want to watch a new super hero movie being released. At block 515, processing logic determines addresses (e.g., email addresses, social network accounts, etc.) and/or phone numbers associated with the identified users. Such information may be included in user accounts of the users. At block 520, processing logic sends reminders and/or encouragements to see the movie to each of the determined addresses and/or phone numbers.

In one embodiment, after a user expresses interest in seeing a movie based on a vote or rating of a movie trailer, that movie is added to a movie list for the user. The movie list may be saved both on a server computing device as well as on a mobile device of the user. When the user opens a movie application, the list of movies that they have indicated interest in seeing may be shown to the user as a reminder.

Figure 6:
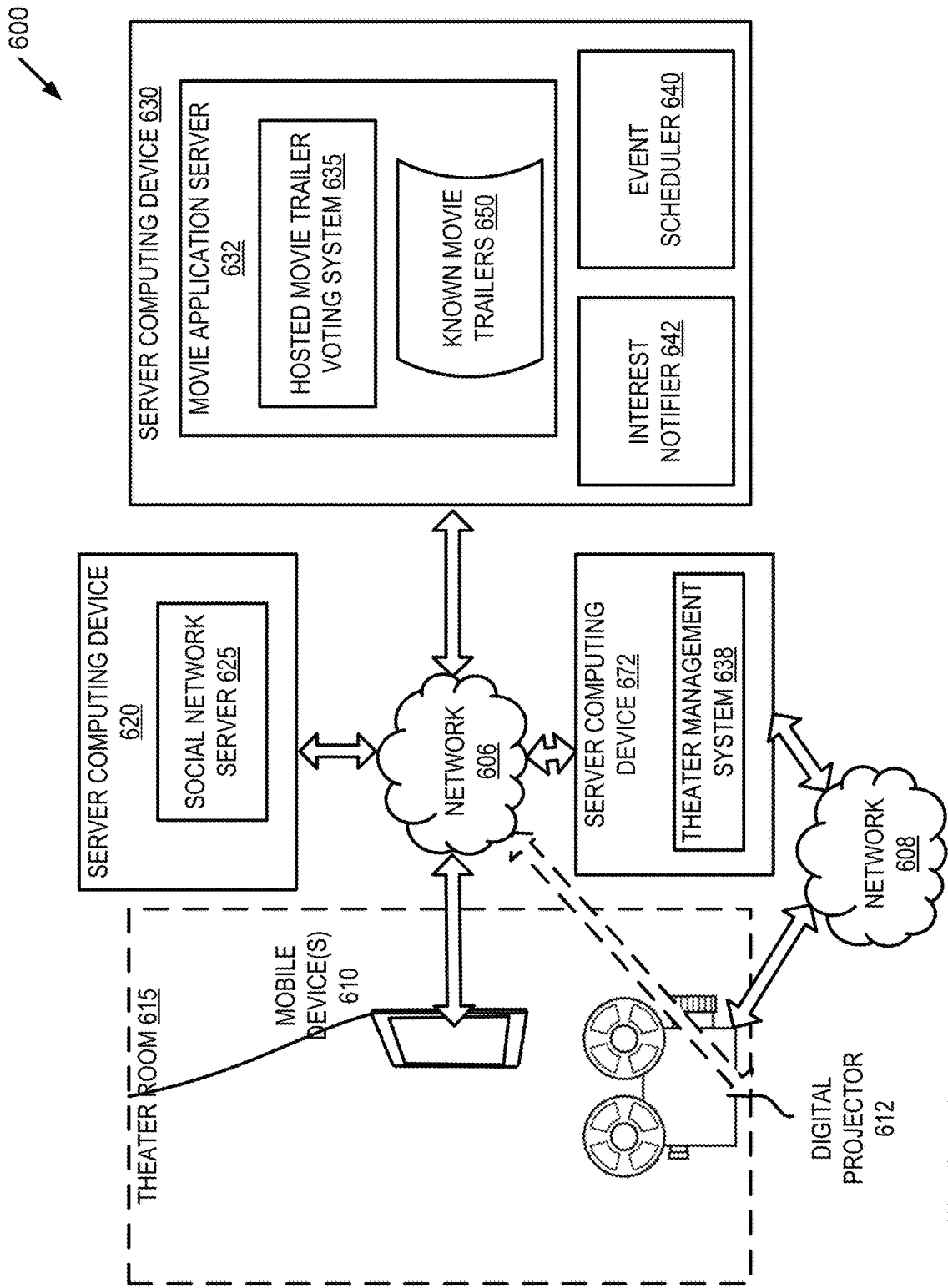
FIG. 6 is a block diagram illustrating a network environment in which embodiments of the present disclosure may operate.

FIG. 6 is a block diagram illustrating a network environment 600 in which embodiments of the present disclosure may operate. In one embodiment, network environment 600 includes a digital projector 612, one or more mobile devices 610, a server computing device 620, a server computing device 630, and network 606 over which the mobile devices 610, digital projector 612 and/or server computing devices 620, 630 may communicate. In one embodiment, the network environment 600 further includes a server computing device 672 connected to the network 606 and to digital projector 612 by a network 608. The network 606 and network 608 may each include a local area network (LAN), a wireless network, a telephone network, a mobile communications network, a wide area network (WAN) (e.g., such as the Internet) and/or similar communication system. The networks 606, 608 can include any number of networking and computing devices such as wired and wireless devices. In one embodiment, network 606 is a public network such as the Internet, and network 608 is a private network such as an intranet or a local area network (LAN).

The server computing device 620, server computing device 672 and server computing device 630 may include a physical machine and/or a virtual machine hosted by a physical machine. The physical machine may be a rack-mount server, a desktop computer, or other computing device. In one embodiment, the server computing devices 620, 630, 672 can include a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

Mobile devices 610 are mobile computing devices such as an electronic book reader, portable digital assistant, mobile phone, laptop computer, portable media player, tablet computer, camera, video camera, netbook, notebook, and the like. Mobile devices 610 may include a memory, a processing device (e.g., one or more microprocessor), a display, a microphone, speakers, and so on.

Digital projector 612 is a digital movie projector that receives digital movie files for playback and that plays or projects movies from the received digital movie files. Digital projector 612 and/or associated theater management system 638 may receive digital movie files from network 606 and/or from a dedicated satellite link. Digital projector 612 may include a digital light processing (DLP) device, one or more network adapters for connecting to network 606, a processing device, a memory, a solid state drive and/or disk drive, and/or other components commonly found in computing devices.

The playback of the content by digital projector 612 may be controlled by a playlist. The playlist is a list of all the content that is to be played as part of the performance of a feature presentation, including movie trailers and/or other video clips. In addition to listing the content to be played the playlist may also include time indexes of when particular content is to be played, lengths of content (e.g., clips, movie trailers and/or feature movie), automation cues that allow the playlist to control the digital projector, a sound system in theater room 615, auditorium lighting in theater room 615, tab curtains and screen masking (it present) in theater room 615, etc. The playlist can be started manually, by clicking the "play" button on the digital projector 612 (or server computing device 672 that interfaces with the digital projector 612), or automatically at pre-set times.

In one embodiment, digital projector 612 is controlled by a theater management system 638 that executes on server computing device 672. The theater management system 638 may additionally control other digital projectors at the same theater as digital projector 612 and/or at different theaters. The server computing device may be a local server computing device located at a theater that includes digital projector 612 or may be a remote server computing device. The theater management system 638 may generate a playlist and send the playlist to digital projector 612. Alternatively, theater management system 638 may store a playlist and send instructions to the digital projector 612 to play a particular video, movie or clip at a given time. When one video, clip or movie ends, theater management system 638 may send a new instruction to play a next video, clip or movie.

Each mobile device 610 may include installed thereon a movie application (not shown). The movie application may include a graphic user interface (GUI), movie voting logic and/or data for one or more known movie trailers. The graphic user interface may provide a menu of display options. A user may navigate the GUI by selecting (e.g., pressing buttons associated with) options to preview movies playing in theaters, view trailers, purchase movie tickets, and so on. A user may select to organize or filter movies by location, movie, genre, playtime, and so on. The movie application on each mobile device 610 is associated with a particular user account of a movie application server 632. The movie application may log into the movie application server 632 using credentials associated with a particular user account.

In one embodiment, the movie application includes a movie voting logic. The movie voting logic enables users to vote on or rate movie trailers. The rating (or ranking) or voting applied to a movie trailer for a user account indicates user sentiment about a movie represented in the movie trailer.

Digital projector 612 and/or theater management system 638 may include a playlist of movie trailers, video clips and/or a feature movie to be played. When the digital projector 612 begins executing the playlist (or a movie trailer, video clip or movie from the playlist), the digital projector 612 may send a message to movie application server 132 indicating that execution of the playlist is commencing. Alternatively, a theater management system 638 that controls digital projector 612 may send the message to the movie application server 132 when it sends an instruction to the digital projector 612 to begin execution of the playlist or of a particular movie trailer, video clip or movie in the playlist. The message may include the playlist and/or a playlist identifier that can be used by movie application server 632 to look up the playlist. Alternatively, the message may include an identifier of a single movie trailer, video clip or movie to be played next.

In one embodiment, server computing device 630 includes a movie application server 632 and an event scheduler 640. Movie application server 632 may interface with one or more movie applications 670 to provide a movie trailer voting experience. In one embodiment, movie application server 632 includes a hosted movie trailer voting system 635 that interfaces with mobile web browsers of mobile devices 610 to provide a movie trailer voting experience.

Movie application server 632 may determine those mobile devices 610 that are located in theater room 615. In one embodiment, the mobile devices 610 include movie applications, and the movie applications communicate geolocation information to application server 632, which application server 632 may use to determine a location of the mobile devices 610. In one embodiment, the theater room 615 includes a wireless transmitter (e.g., a Bluetooth transmitter) that broadcasts a unique identifier. Different theater rooms of the same and different theaters may include wireless transmitters that broadcast different unique identifiers. Mobile devices 610 that include the movie application may receive the broadcast of the unique identifier and send a message to movie application server 632 comprising the unique identifier.

Alternatively, the unique identifier might be digitally embedded in the video (e.g., movie trailer) being played by the digital projector. The unique identifier may be an audio identifier that is not audible to humans (e.g., an ultrasonic audio code). In such an instance, mobile devices 610 that include the movie application may receive audio of a movie trailer, and a decoder in the movie application may determine the unique identifier from the audio (e.g., convert an audio code into non-audio data such as text/numerical data) and send a message to the movie application server 632 comprising the unique identifier. The unique identifier may have been encoded into an audio format using one or more audio modulation schemes such as frequency shift keying, phase shift keying, pulse modulation, and so on.

Movie application server 632 may then determine that the mobile devices 610 are in the theater room 615 based on the unique identifier. In one embodiment, users purchase movie tickets from the movie applications on their mobile devices 610 or online using user accounts associated with the movie application on their mobile devices. In some embodiments, movie tickets may be purchased without user accounts using pay systems such as Apple® Pay. The movie ticket purchases may be for a particular location and show time. The particular location and show time may be used to determine that the users (and their mobile devices 610) are in the theater room 615.

Responsive to receipt of the message from the digital projector 612 or theater management system 638 by movie application server 632, movie application server 632 may determine from the playlist a sequence of movie trailers that will be played and/or a next movie trailer to be played. Movie application server 632 may additionally determine information about the movie trailers in the playlist, such as lengths of the movie trailers, from a data store of known movie trailers 650. Alternatively, the lengths of the movie trailers may be indicated by, or determinable from, the playlist. Movie application server 632 may send messages to the mobile devices 610 in the theater room 615 responsive to receipt of the message from the digital projector 612 (or computing device that controls the digital projector). The messages may contain the sequence of movie trailers along with lengths of each of the movie trailers. Alternatively, the messages may contain an indicator of a next movie trailer to be played and its length.

Movie application server 632 may synchronize movie trailer feedback experiences on the mobile devices 610 with projection of the sequence of movie trailers by the digital projector such that the mobile devices 610 prompt users to provide user feedback regarding the movie trailers in the sequence of movie trailers during playback of each of the movie trailers. For example, mobile devices 610 may present a movie trailer voting display responsive to receipt of the message from the movie application server 132. The movie trailer voting display may include a movie trailer being played, a time offset into the movie trailer, and amount of time left in the movie trailer and/or a prompt for a user to provide user feedback about a movie trailer (e.g., to vote on or rate a movie trailer). Based on the received sequence of movie trailers and movie trailer lengths, a movie application on mobile devices 610 may determine when each of the movie trailers will end. At or around the predicted time at which a movie trailer will end, the movie application may prompt a user of mobile device to provide user feedback (e.g., user sentiment) about the movie trailer. The prompt may include a brightening of a display of the mobile device 610, a vibration of the mobile device 610 and/or an output of a push notification that is intended to draw the user's attention to the previously output prompt for user feedback.

If the received movie trailer sequence indicates that further movie trailers will be played, then the movie trailer voting display may again be shown so that the user may vote on a next movie trailer. This may be repeated until all movie trailers in the movie trailer sequence have been played.

Once a user has provided user feedback, the movie application on the mobile devices 610 may send a message to movie application server 632 that includes the user feedback. In one embodiment, user feedback for multiple movie trailers may be sent in a single message after some or all movie trailers in the playlist have been voted on. Movie application server 632 may then store the user feedback in the user account associated with a mobile device 610 from which the user feedback was received.

In one embodiment, digital projector 612 and/or theater management system 638 sends a message to movie application server 632 each time a new movie trailer begins. Movie application server 632 may then send a similar message to mobile devices 610 indicating that a new movie trailer has begun. In such an embodiment, digital projector 612 (or the computing device controlling digital projector 612) may or may not send the playlist to movie application server.

Movie trailer identification and voting has been described with reference to a mobile device 610 that includes a movie application. However, in some instances a mobile device 610 may lack a movie application or may include a movie application that lacks a movie voting logic. In such instances, a mobile website may be used to provide the same functionality described with reference to a movie application. In one embodiment, mobile device 610 uses a mobile web browser to navigate to a mobile website provided by hosted movie trailer voting system 635 that provides a movie trailer voting experience. The mobile website may offer all of the same functionality as described with reference to the movie application. In an example, a message may be presented on the screen in the theater room 615 that prompts users to text a particular message (e.g., a short message service (SMS) message or a multimedia messaging service (MMS) message) to an identified address or phone number. The message may be sent using a messaging protocol such as SMS, MMS, email, iMessage®, WhatsApp®, GroupMe®, WeChat®, Facebook® Messenger, Google® Hangouts, and so on. The particular message may be or include a key that identifies a particular feature movie, that identifies a desire to access a movie trailer experience and/or that identifies a particular showing of a feature movie. Responsive to receiving the message, movie application server 632 may generate a link (e.g., a universal resource locator (URL) or hyperlink) to an instance of the movie voting website, and may send a response message to the mobile device 610. The response message may be sent using the same messaging protocol that the mobile device 610 used to send the initial message. Alternatively, a different messaging protocol may be used.

Responsive to mobile device 610 receiving the response message, a user may select the link to navigate to the instance of the movie trailer voting website. This may cause the mobile device 610 to download data such as HTML, CSS, and/or JavaScript that may perform one or more of the operations described above. The link may direct the browser of the mobile device 610 to a website that is preloaded with the sequence of movie trailers and their lengths. Accordingly, the website may output a push notification to the mobile device, cause the display of the mobile device to brighten, cause the mobile device to vibrate, etc. as each movie trailer ends.

Event scheduler 640 corresponds to event scheduler 140 of FIG. 1. Accordingly, event scheduler 640 identifies users who may want to attend events together and facilitates scheduling of joint attendance of such events for those users. Event scheduler 640 may determine relationships between user accounts using one or more sources of relationship information. In one embodiment, event scheduler 640 accesses a social network graph or other third party data set of a social network server 625 (or other third party) executing on server computing device 620 to determine relationship information about user accounts and associated users, as described above with reference to FIG. 1.

Interest notifier 642 may perform the same operations of similarly named interest notifier 142 of FIG. 1.

Figure 7:
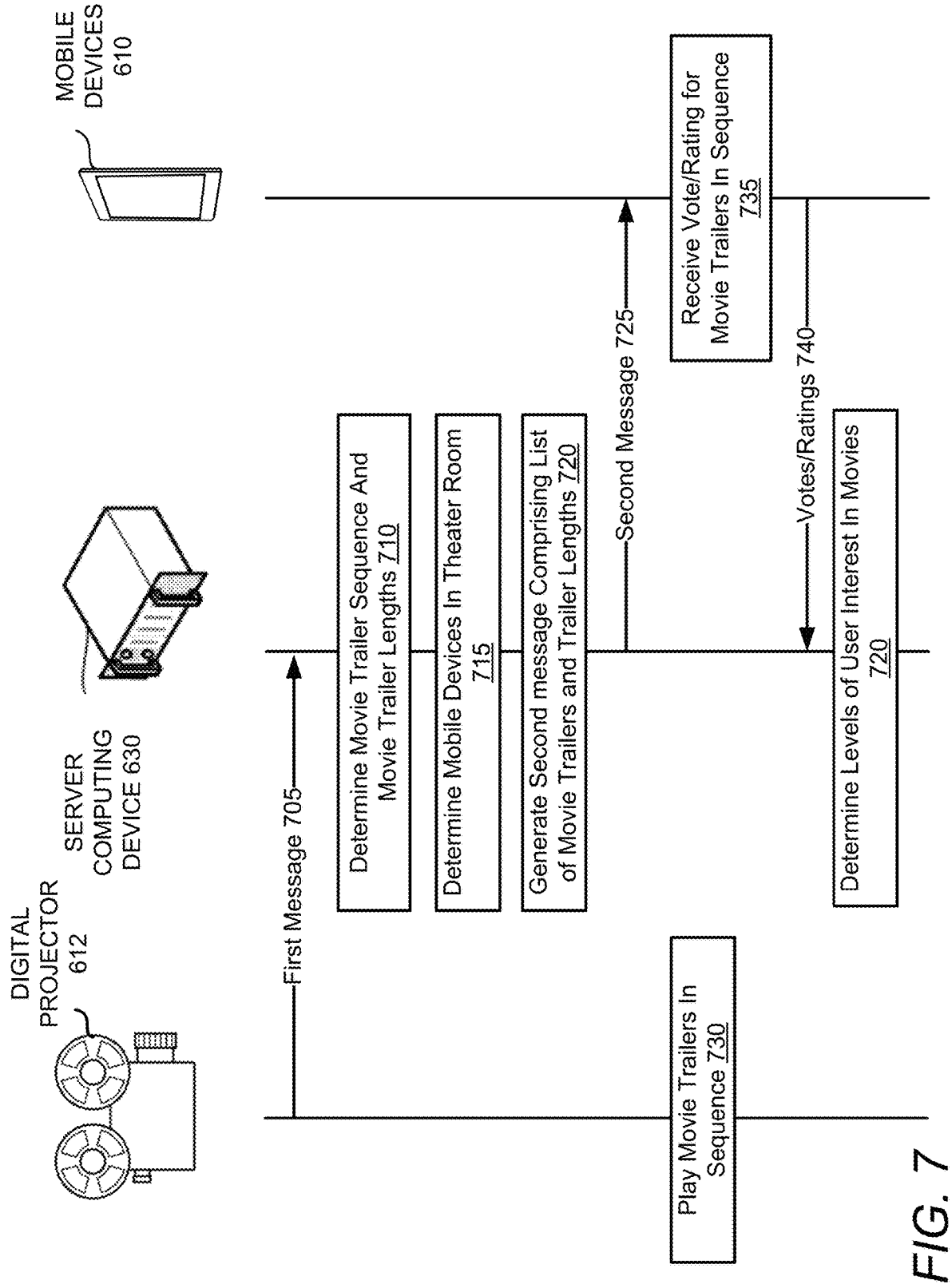
FIG. 7 is a sequence diagram illustrating a movie trailer voting process, according to an embodiment.

FIG. 7 is a sequence diagram illustrating a movie trailer voting process, according to an embodiment. The sequence diagram includes a digital projector 612, a server computing device 630, and a plurality of mobile devices 610, each of which may perform one or more operations for the movie trailer voting process. The movie trailer voting process may begin with digital projector 612 and/or theater management system 638 sending a first message to server computing device 630 at block 705. The first message may include a playlist associated with a feature presentation. Before, commensurate with, or after sending the first message at block 705, digital projector 612 may begin playing the movie trailers identified in the playlist in sequence (block 730). In one embodiment, theater management system 638 sends the first message to server computing device 630 and also sends a command to digital projector 612 to begin playing a first movie trailer in the playlist. The command may include the playlist in an embodiment.

At block 710, the server computing device 630 determines a movie trailer sequence and movie trailer lengths for the movie trailers in the movie trailer sequence. At block 715, the server computing device 630 determines mobile devices that are in a theater room associated with digital projector 612. At block 720, the server computing device 630 generates a second message comprising the list of movie trailers and movie trailer lengths. The second message may also include an instruction to prompt a user to vote on or rate each of the movie trailers as each of the movie trailers ends.

At block 725, the server computing device 630 sends the second message to the plurality of mobile devices 610 in the theater room. At block 735, the mobile devices each prompt users for user feedback and receive such user feedback (e.g., votes and/or ratings) for the movie trailers in sequence. At block 740, the mobile devices then send the user feedback (votes/ratings) back to the server computing device. At block 720, the server computing device 630 may then determine levels of user interest in the movies associated with the movie trailers that were played by the digital projector 612.

In one embodiment, digital projector 612 is operatively coupled to a Bluetooth transmitter (or other wireless transmitter) in a theater room containing mobile devices 610. When each movie trailer is to begin, digital projector 612 may broadcast a message using the Bluetooth transmitter indicating that a new movie trailer is to begin. This may cause the mobile devices to prompt a user for user feedback regarding a movie trailer. Alternatively, or additionally, digital projector 612 and/or theater management system 638 may be operatively coupled to a wireless internet protocol (IP) network such as a Wi-Fi network. Digital projector 612 and/or theater management system 638 may send a message indicating that a new movie trailer is to begin via a push notification or wakeup signal using the wireless IP network.

Figure 8:
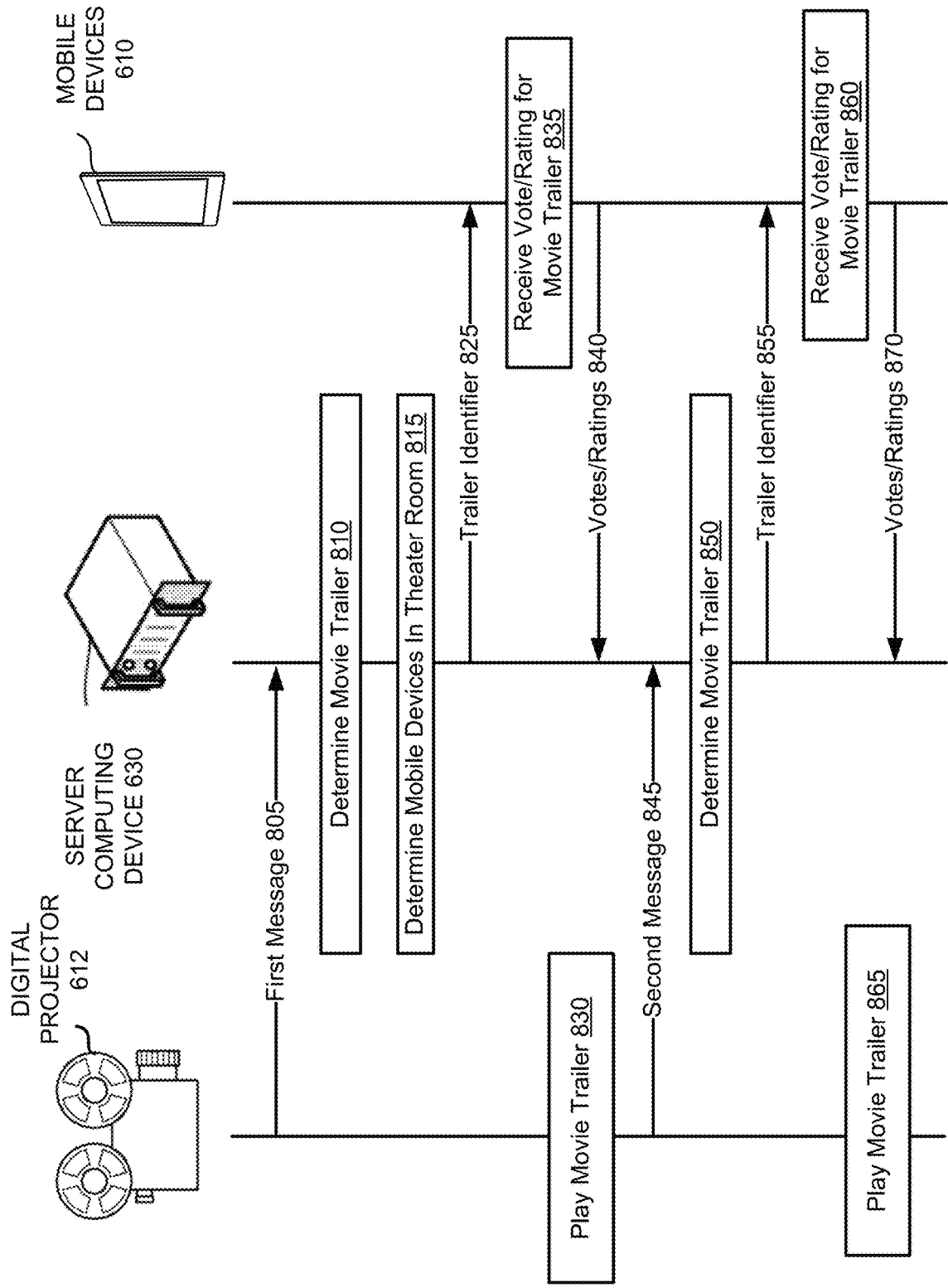
FIG. 8 is a sequence diagram illustrating a movie trailer voting process, according to an embodiment.

FIG. 8 is a sequence diagram illustrating a movie trailer voting process, according to an embodiment. The sequence diagram includes a digital projector 612, a server computing device 630, and a plurality of mobile devices 610, each of which may perform one or more operations for the movie trailer voting process. The movie trailer voting process may begin with digital projector 612 and/or theater management system 638 sending a first message to server computing device 630 at block 805. The first message may include a playlist associated with a feature presentation and/or may include an indication of a first movie trailer to be played. Before, commensurate with, or after the sending of the first message at block 805, digital projector 612 may begin playing the first movie trailer (block 830).

At block 810, the server computing device 630 may determine the first movie trailer and/or a length of the first movie trailer. At block 815, the server computing device 630 determines mobile devices that are in a theater room associated with digital projector 612. At block 825, the server computing device 630 generates a message comprising an identifier of the first movie trailer and/or a length of the first movie trailer.

At block 835, the mobile devices each prompt users for user feedback and receive such user feedback (e.g., votes and/or ratings) for the movie trailers. The prompt may be presented via a movie trailer voting display on the mobile devices 610. The movie trailer voting display may be shown upon receipt of the trailer identifier and/or when the first trailer ends. In one embodiment, mobile devices 610 determine when the first trailer will end based on a time stamp included in the first message and second message, which indicated when the digital projector 612 started playing the first trailer and the length of the first movie trailer (e.g., by adding the length of the first movie trailer to the time stamp to compute the end time). Mobile devices 610 may then prompt a user for feedback (e.g., by brightening a display and/or vibrating) when the movie trailer ends. Alternatively or additionally, mobile devices may show a movie trailer voting display when the movie trailer ends. The movie trailer voting display may include options (e.g., buttons) to select a rating and/or to vote on the movie trailer. The user may select the desired rating and/or vote, which may constitute user feedback. At block 840, the mobile devices then send the user feedback (votes/ratings) for the first movie trailer back to the server computing device.

At block 845, the digital projector 612 and/or theater management system 638 sends a second message to server computing device 630. The second message may include an indication of a second movie trailer to be played. Before, commensurate with, or after the sending of the second message at block 845, digital projector 612 may begin playing the second movie trailer (block 865).

At block 850, the server computing device 630 may determine a second movie trailer and/or a length of the second movie trailer. At block 855, the server computing device 630 generates a message comprising an identifier of the second movie trailer and/or a length of the second movie trailer. At block 860, the mobile devices each prompt users for user feedback and receive such user feedback (e.g., votes and/or ratings) for the movie trailers. At block 870, the mobile devices then send the user feedback (votes/ratings) for the first movie trailer back to the server computing device.

Figure 9:
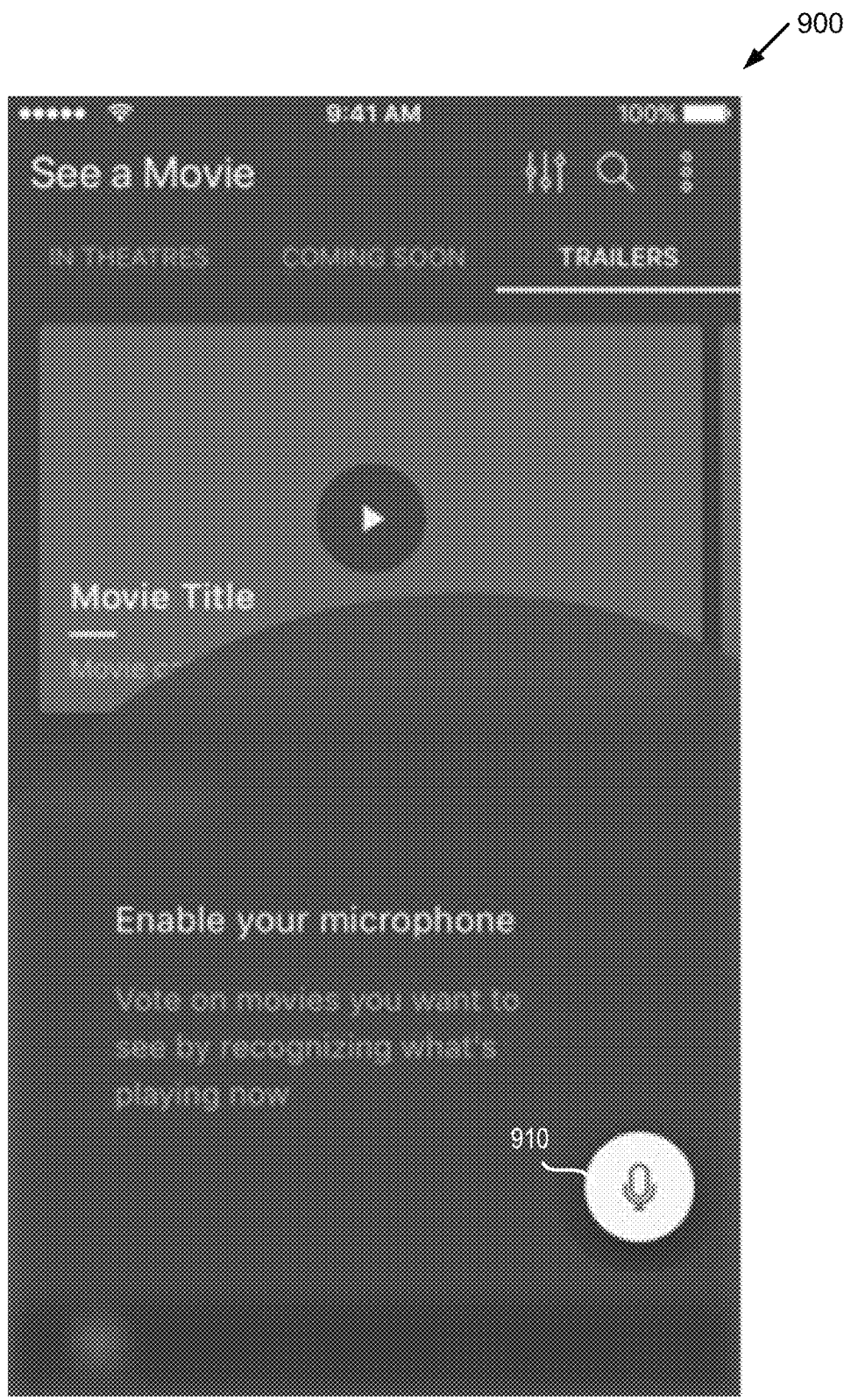
FIG. 9 is a screen shot of a movie application prior to activation of a mobile trailer voting mode, according to an embodiment.

FIG. 9 is a screen shot 900 of a movie application prior to activation of a mobile trailer voting mode, according to an embodiment. As shown, a microphone button 910 is provided to enable a user to activate a mobile device's microphone. A user may press the microphone button 910 to enable the microphone and place the movie application into a movie trailer voting mode. Alternatively, the movie application may be automatically placed into movie trailer voting mode and the microphone may automatically be enabled at a certain time (e.g., when the movie is scheduled to begin and/or when the user launches the movie application).

Figure 10:
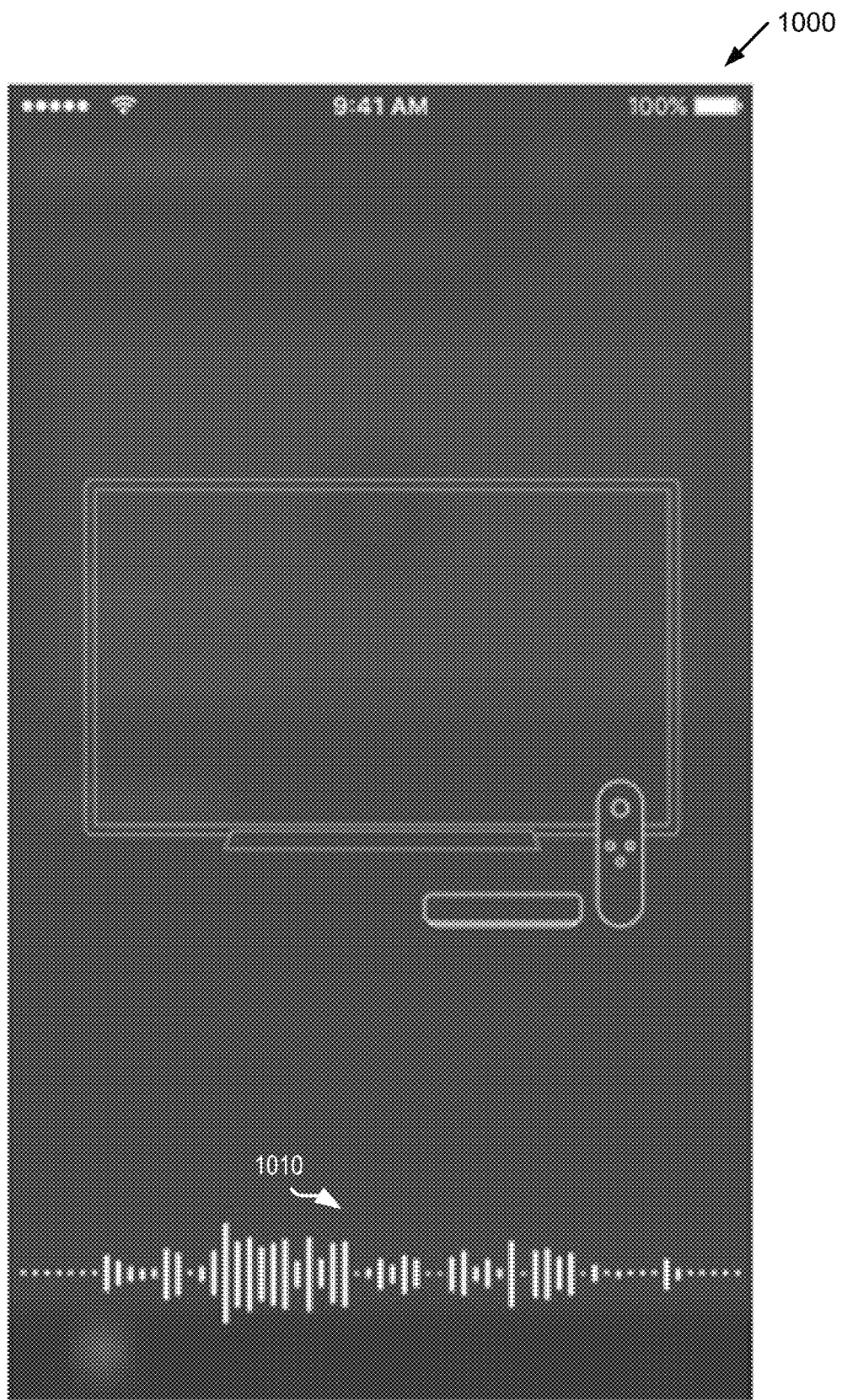
FIG. 10 is a screen shot of a movie application after activation of a mobile trailer voting mode and before a movie trailer is identified, according to an embodiment.

FIG. 10 is a screen shot 1000 of a movie application after activation of a mobile trailer voting mode and before a movie trailer is identified, according to an embodiment. The movie application may enter the movie trailer voting mode shown in screen shot 1000 after a user presses microphone button 910 of screen shot 900. This may cause the movie application to begin capturing audio data and attempting to identify a movie trailer from the audio data. While capturing audio data, the movie application may display an audio visualization 1010 based on the captured audio data.

Figure 11:
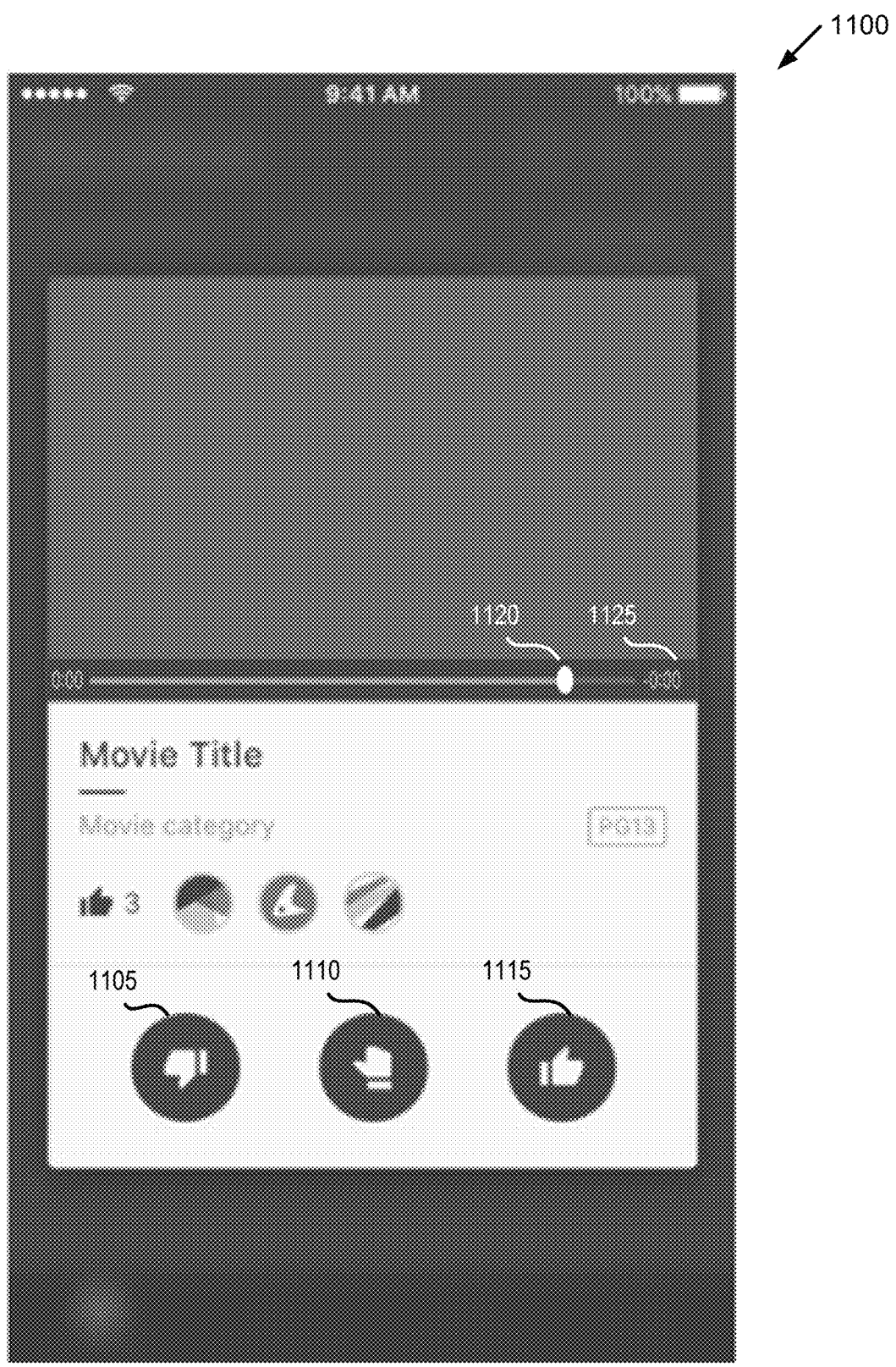
FIG. 11 is a screen shot of a movie application after a movie trailer is identified, according to an embodiment.

FIG. 11 is a screen shot 1100 of a movie application after a movie trailer is identified, according to an embodiment. The movie application may identify a time index in the movie trailer as well as an identity of the movie trailer. The movie application may further determine a length of the movie trailer once the movie trailer is identified. The time index 1120 representing the time offset into the movie trailer that is presently being played is shown as well as the movie trailer length 1125 or ending time.

The screen shot 1100 further shows a title of the movie associated with the movie trailer, and a number of positive and/or negative votes of the movie trailer by others (e.g., others that have a relationship with a user of the mobile device running the movie application). Additionally, the screen shot 1100 shows buttons or options for a thumbs up or positive vote 1115 for the movie trailer, a maybe vote 1110 for the movie trailer and a thumbs down or negative vote 1105 for the movie trailer. In one embodiment, a user can vote that they are interested in seeing the movie by pressing on a button for the thumbs up vote 1115 or by swiping to the right. In one embodiment, a user can vote that they are not interested in seeing the movie by pressing on a button for the thumbs down vote 1105 or by swiping to the left. In one embodiment, a user can vote that they are unsure of whether they want to see the movie by pressing on a button for the maybe vote 1110 or by swiping up or down.

Figure 12:
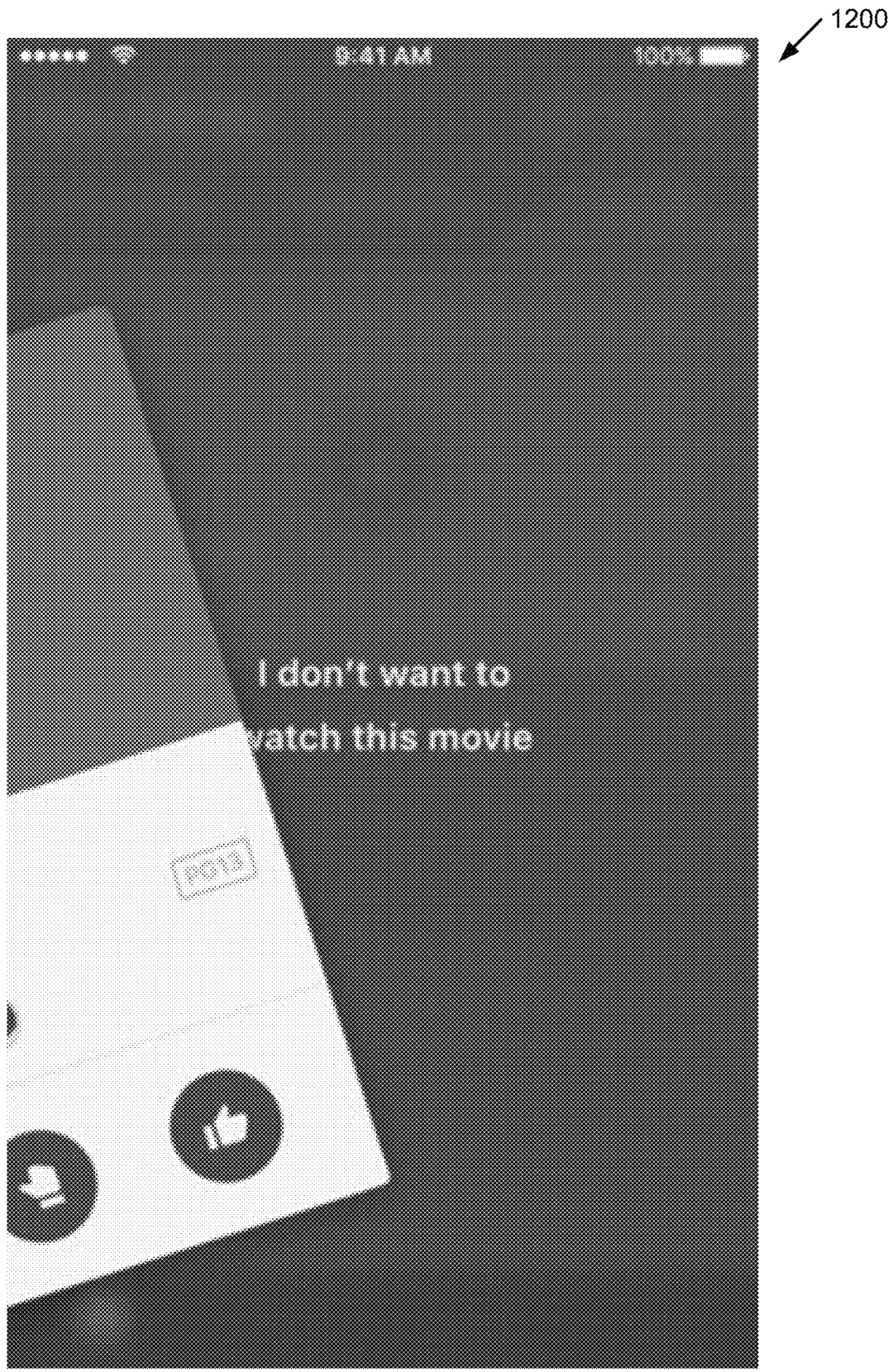
FIG. 12 is a screen shot of a movie application after a user has indicated that they do not want to watch a movie associated with a movie trailer, according to an embodiment.

FIG. 12 is a screen shot 1200 of a movie application after a user has indicated that they do not want to watch a movie associated with a movie trailer, according to an embodiment. For example, a user may have swiped left after being provided a display shown in screen shot 1100.

Figure 13:
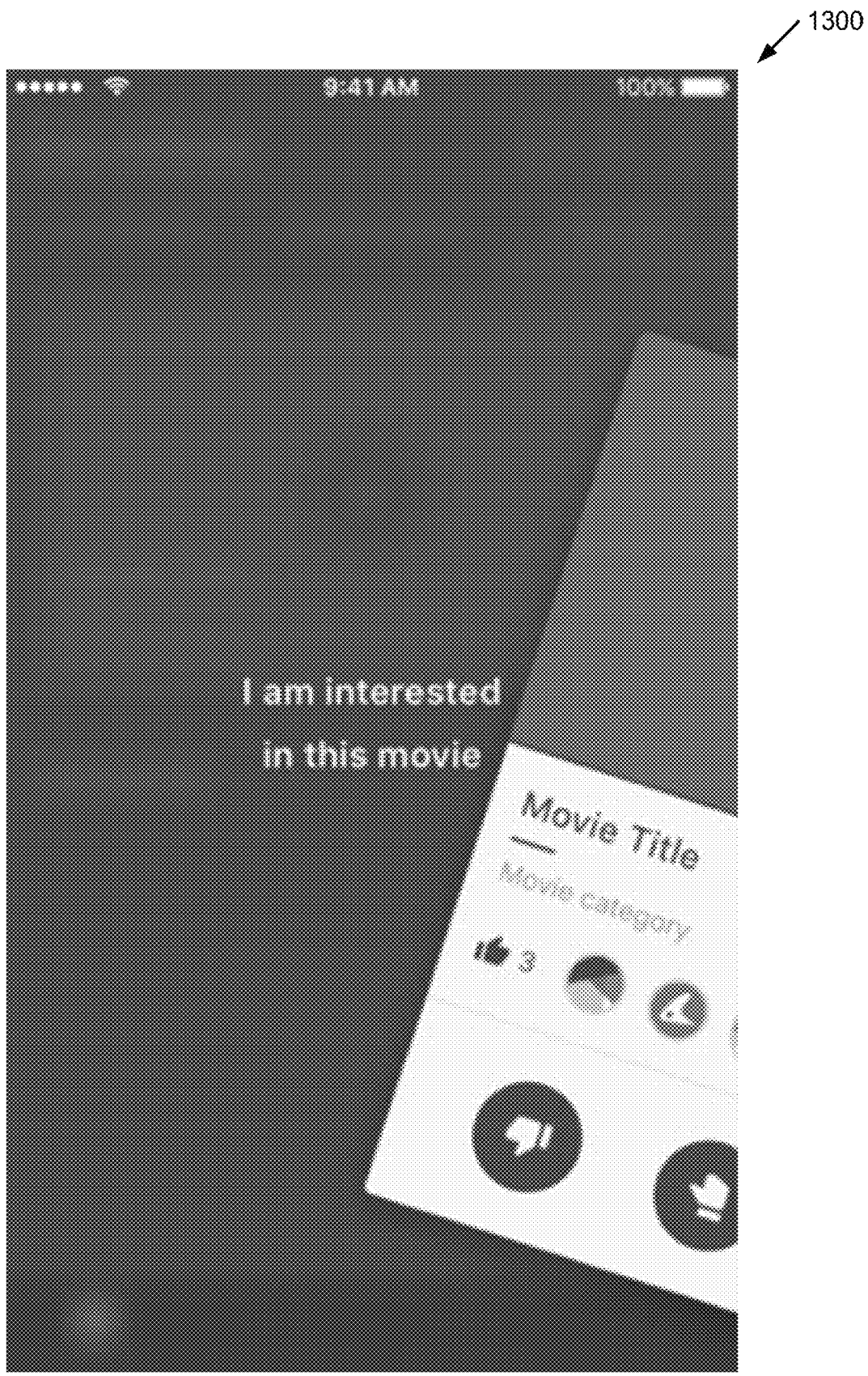
FIG. 13 is a screen shot of a movie application after a user has indicated that they do want to watch a movie associated with a movie trailer, according to an embodiment.

FIG. 13 is a screen shot 1300 of a movie application after a user has indicated that they do want to watch a movie associated with a movie trailer, according to an embodiment. For example, a user may have swiped right after being provided a display shown in screen shot 1100.

Figure 14:
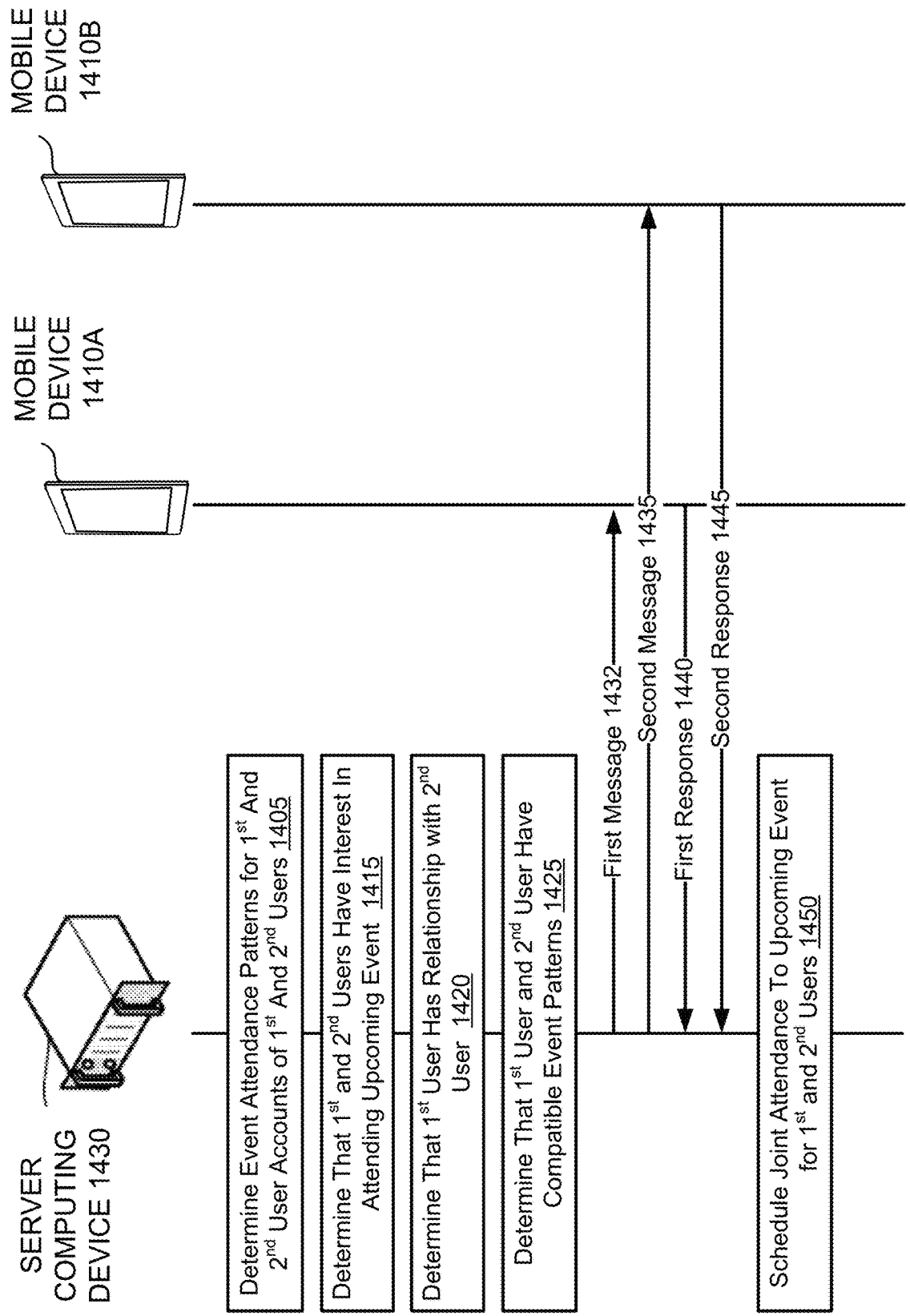
FIG. 14 is a sequence diagram illustrating an event scheduling process, according to an embodiment.

FIG. 14 is a sequence diagram illustrating an event scheduling process, according to an embodiment. The sequence diagram includes a server computing device 1430, a mobile computing device 1410A and a mobile computing device 1410B, each of which may perform one or more operations for the scheduling process. Server computing device 1430 may correspond to server computing device 130 of FIG. 1 or server computing device 630 of FIG. 6 in embodiments. Mobile devices 1410A, 1410B may correspond to mobile devices 110 of FIG. 1 or mobile devices 610 of FIG. 6 in embodiments.

The scheduling process may begin with server computing device 1430 determining event attendance patterns for first and second user accounts of first and second users, respectively (block 1405). The event attendance patterns may be based on one or more of prior event attendance, expressed interest in attending future and/or past events, inferred interest in attending future and/or past events (e.g., based on user clicks on banners, web pages, menu options, etc. associated with events), user feedback associated with movie trailers (e.g., as provided by movie application server 132 or movie application server 632) and/or other information. Some of the data may be received as notices from applications executing on mobile devices of users (e.g., messages indicating user votes or ratings of movie trailers).

The event attendance patterns may be data from a single data point or statistical patterns based on a combination of multiple data points. Each data point may include one or more items of information including the type of event (e.g., movie, sporting event, comedy show, etc.), a subcategory within the type of event (e.g., movie genre, key actors, sporting event type, sporting event team, performer, etc.), a time of the event, a date of the event, an event location, an event cost, a number of tickets purchased for the event, and so on. Location may include state, county, city and/or more particular location such as venue or address.

Different types of data points may be assigned different weights in determining an event attendance pattern. For example, data points representing inferred interest (e.g., click through events) may be given lower weight than data points representing expressed interest (e.g., user feedback on a movie trailer indicating that a user wants to see the movie associated with the movie trailer). In some instances, server computing device 1430 may prompt a user to vote on whether they are interested in attending an event. A user may be prompted, for example, after that user has performed some actions that result in an inferred interest in an event. The user may be prompted based on the inferred interest in the event to determine if the inferred interest translates to an express interest in attending the event. The event attendance pattern for a user account may include preferred days of the week, preferred times of day, preferred venues, and so on. For example, a user may usually watch movies at 7-9 PM on Friday nights at theaters in a particular city or in a particular district of a city. Even attendance patterns may additionally identify a frequency that a user addends events (e.g., events generally or specific types of events), a number of people the user typically attends events with, and so on. Distinct event attendance patterns may be determined for different types of events.

At block 1415, the server computing device determines that the first user and the second user both have an interest in attending the same event. The interest in seeing the event may be based on inferred interest in the event (e.g., click throughs of a user browsing tickets online), expressed interest (e.g., user feedback for a movie trailer indicating that the user wants to see the associated movie), event attendance patterns and/or other data sources mentioned herein.

In one embodiment, event interest graphs are generated for user accounts. Event interest graphs may include data from the event attendance patterns of a user. Event interest graphs may indicate, for example, types of events a user is interested in, genres within a type of event that a user is interested in (e.g., movie genres), specific actors a user likes, specific directors a user likes, specific producers a user likes, and so on. Interest graphs may also indicate negative information on events, genres, actors, directors, producers, etc. that a user does not like.

At block 1420, the server computing device 1430 determines that the first user and second user have some relationship with one another. This determination may be made from a third party dataset (e.g., from a social networking graph of a social network service), from contact information of the first user account and/or second user account (e.g., from contact lists stored on mobile devices of the first and second users), and/or from other sources.

At block 1425, the server computing device 1430 determines that the first user and the second user have compatible event patterns. A compatible event pattern may be determined if the first user and the second user each attend events at or near the same locations. A compatible event pattern may also take into account overlapping times that the first and second user attend events, overlapping days of the week that the first and second user attend events, overlapping amounts of money that the first and second user spend to attend events, and/or other information. For example, if the first user and second user each regularly attend football games at the same football stadium on the same days of the week and same times, and they each purchase tickets for similarly priced seats, then they may have compatible event patterns. However, if the first user and second user each regularly attend football games at the same football stadium on the same days of the week and same times, but they purchase tickets for wildly differently priced seats, then they may not have compatible event patterns.

In one embodiment, an event pattern compatibility score is determined for the event attendance patterns of the first and second user. The event pattern compatibility score may take into account some or all of the aforementioned parameters. The parameters may be evenly weighted or may be assigned different weights. For example, location may have a higher weight than day of the week. If the event pattern compatibility score exceeds a threshold, then server computing device 1430 may determine that the first and second user have compatible event patterns. The event pattern compatibility may be determined for a particular type of event associated with the upcoming event that the first and second user both have an interest in attending.

At block 1432, server computing device 1430 sends a first message to mobile device 1410A of the first user. The first message includes an inquiry asking whether the first user is interested in attending the event with the second user. The first message may or may not include information such as location, time, day, price, and so on. At block 1435, server computing device 1430 sends a second message to mobile device 1410B of the second user. The second message includes an inquiry asking whether the second user is interested in attending the event with the first user. The second message may or may not include information such as location, time, day, price, and so on.

At block 1440, mobile device 1410A sends a first response to the server computing device 1430. The first response indicates whether the first user is interested in attending the upcoming event with the second user. At block 1445, mobile device 1410B sends a second response to the server computing device 1430. The second response indicates whether the second user is interested in attending the upcoming event with the first user. If either the first user or second user are not interested in attending the event with the other user, then no joint attendance of the event is scheduled. However, if the first response and second response each indicate an interest in attending the event with the other user, then at block 1450 the server computing device 1430 schedules joint attendance to the upcoming event for the first and second users.

Figure 15:
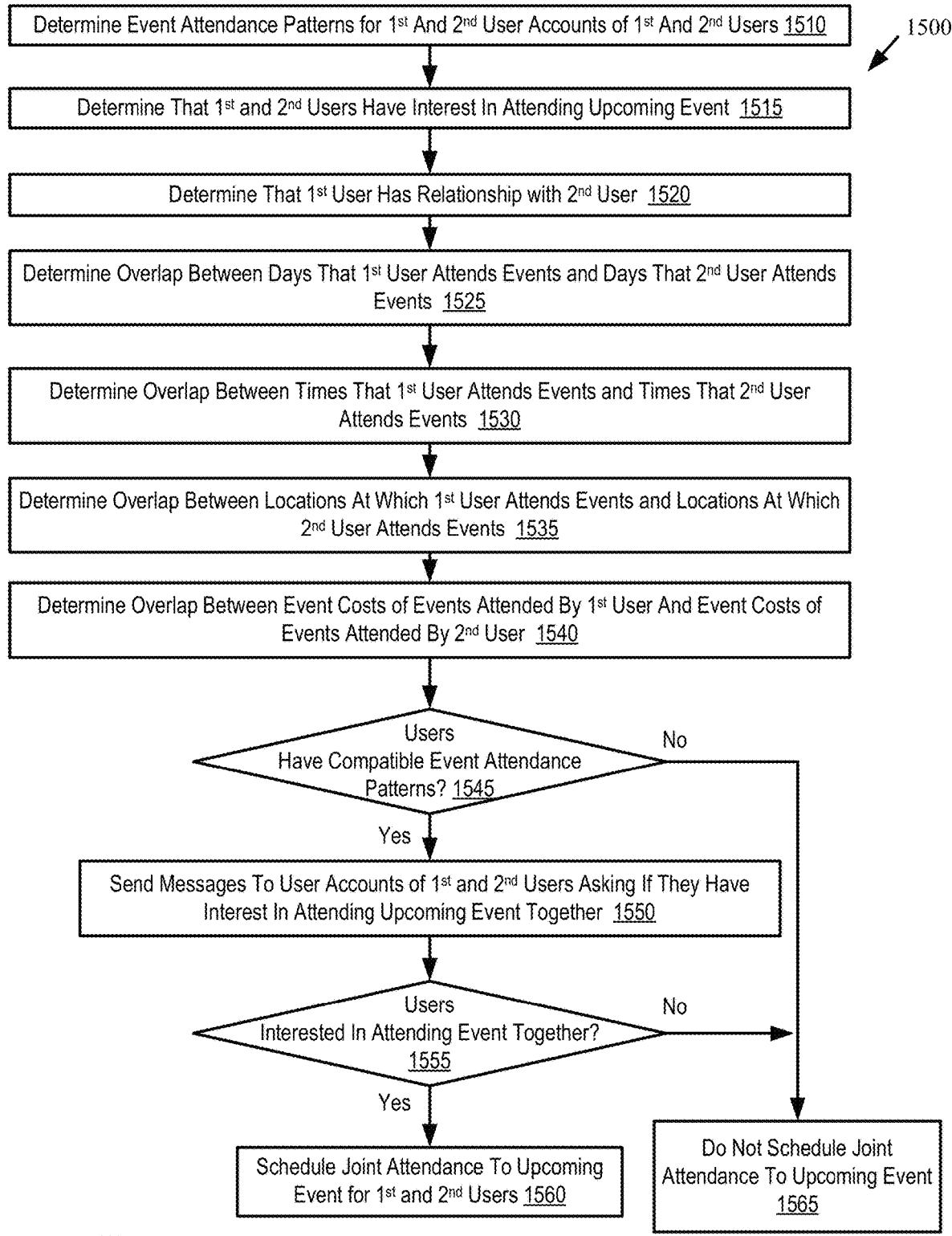
FIG. 15 is a flow diagram illustrating a method of identifying users to attend an event together, according to an embodiment.

FIG. 15 is a flow diagram illustrating a method 1500 of identifying users to attend an event together, according to an embodiment. Method 1500 may be performed by processing logic that comprises hardware (e.g., circuitry, dedicated logic, programmable logic, microcode, etc.), software (e.g., instructions run on a processor), firmware, or a combination thereof. The method 1500 may be performed, for example, by server computing device 130 of FIG. 1 or server computing device 630 of FIG. 6 in embodiments.

At block 1510 of method 1500, processing logic determines event attendance patterns for first and second user accounts associated with first and second users, respectively. At block 1515, processing logic determines that the first and second users have an interest in attending the same event. At block 1520, processing logic determines that the first user has a relationship with the second user.

At block 1525, processing logic determines that there is an overlap between days that the first user attends events and days that the second user attends events. The overlap may be determined for events of a particular type or generally for all events. At block 1530, processing logic determines that there is an overlap between times that the first user attends events and times that the second user attends events. The overlap may be determined for events of a particular type or generally for all events. At block 1535, processing logic determines that there is an overlap between locations at which the first user attends events and locations at which the second user attends events. The overlap may be determined for events of a particular type or generally for all events. At block 1540, processing logic determines that there is an overlap between event costs for events that the first user attends and events costs for events that the second user attends. The overlap may be determined for events of a particular type or generally for all events.

Other types of event attendance pattern overlap may also be determined between two or more users than those described above. One additional type of event attendance pattern overlap or compatibility includes type of theater. For example, movies may be played in three dimensional (3D) IMax® screens or in two dimensional (2D) standard digital screens. Some users may prefer to watch 3D movies, while other users may prefer to watch 2D movies. Accordingly, processing logic may determine whether there is overlap in movie screen preference. Additionally, some users may prefer to attend events such as movie showings on opening day, while other users may prefer to attend events after they have been available for a while. Accordingly, processing logic may determine overlap of this event attendance preference.

At block 1545, processing logic determines whether the first user and the second user have compatible event attendance patterns. The users may be determined to have compatible event attendance patterns if there is some overlap for some or all of the days (e.g., at least one overlapping day of the week), times (e.g., at least one overlapping time), locations (e.g., at least one overlapping location) and costs (e.g., at least one overlapping cost) for the first and second user. If the users do not have compatible event attendance patterns, the method proceeds to block 1565. If the users do have compatible event attendance patterns, the method continues to block 1550.

At block 1550, processing logic sends messages to the first and second users asking if they have interest in attending the upcoming event together. The messages may be sent via text messaging (e.g., SMS, MMS, a third party chat service, a etc.), email, voice message, or other message type. The messages may be sent to email addresses of the users, to social network accounts of the users, to phone numbers of the users, or to other physical or virtual addresses associated with the users. At block 1555, processing logic receives responses from the users and determines from the responses whether the users are interested in attending the upcoming event together. The response messages may be received using the same or different messaging protocol as was used to send the messages to the users. If the users are both interested in attending the event together, the method proceeds to block 1560 and joint attendance of the first and second users to the upcoming event is scheduled. If one or both of the users is not interested attending the upcoming event together, the method proceeds to block 1565 and processing logic does not schedule joint attendance to the upcoming event for the first and second users.

Figure 16:
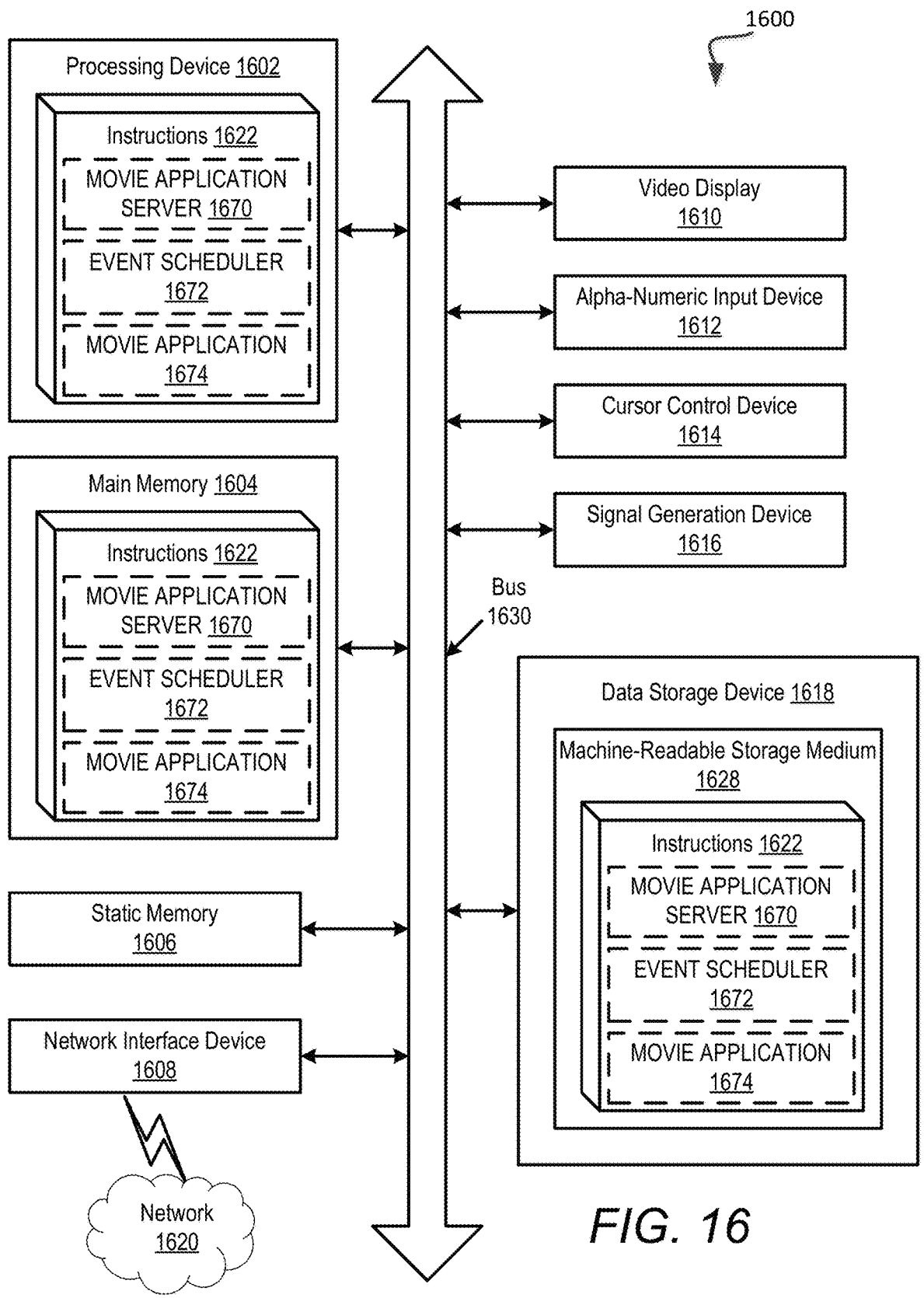
FIG. 16 is a block diagram illustrating an example computer system, according to an embodiment.

FIG. 16 illustrates a diagrammatic representation of a machine in the exemplary form of a computing device 1600 within which a set of instructions, for causing the machine to perform any one or more of the methodologies discussed herein, may be executed. The computing device 1600 may be in the form of a computing device within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server computing device, a network router, switch or bridge, a mobile phone, a tablet computer, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computing device 1600 may represent server computing device 130 as shown in FIG. 1 or server computing device 630 as shown in FIG. 6. In one embodiment, computing device 1600 may represent a mobile device 110 as shown in FIG. 1 or a mobile device 610 as shown in FIG. 6.

The computing device 1600 includes a processing device (processor) 1602, a main memory 1604 (e.g., read-only memory (ROM), flash memory, dynamic random access memory (DRAM) such as synchronous DRAM (SDRAM)), a static memory 1606 (e.g., flash memory, static random access memory (SRAM)), and a data storage device 1618, which communicate with each other via a bus 1630.

Processing device 1602 represents one or more general-purpose processing devices such as a microprocessor, central processing unit, or the like. More particularly, the processing device 1602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1602 may also be one or more special-purpose processing devices such as an application specific integrated circuit (ASIC), a field programmable gate array (FPGA), a digital signal processor (DSP), network processor, or the like. The processing device 1602 is configured to execute a movie application server 1670, an event scheduler 1672 and/or a movie application 1674 for performing the operations and steps discussed herein. Movie application server 1670 may correspond to movie application server 132 of FIG. 1 and/or movie application server 632 of FIG. 6. Event scheduler 1672 may correspond to event scheduler 140 of FIG. 1 and/or event scheduler 640 of FIG. 6. Movie application 1674 may correspond to movie application 170 of FIG. 1 and/or a movie application described with reference to FIG. 6.

The computing device 1600 may further include a network interface device 1608. The computing device 1600 also may include a video display unit 1610 (e.g., a liquid crystal display (LCD) or a cathode ray tube (CRT)), an alphanumeric input device 1612 (e.g., a keyboard), a cursor control device 1614 (e.g., a mouse), and a signal generation device 1616 (e.g., a speaker).

The data storage device 1618 may include a computer-readable medium 1628 on which is stored one or more sets of instructions 1622 (e.g., instructions of identification service 200) embodying any one or more of the methodologies or functions described herein. The instructions 1622 may also reside, completely or at least partially, within the main memory 1604 and/or within processing logic 1626 of the processing device 1602 during execution thereof by the computing device 1600, the main memory 1604 and the processing device 1602 also constituting computer-readable media.

While the computer-readable storage medium 1628 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "receiving", "generating" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:

receiving audio data of a movie trailer by a user device, wherein the user device is a mobile computing device comprising a microphone, wherein the audio data comprises one or more audio encoding comprising a) a unique identifier associated with the movie trailer and b) at least two of an image associated with the movie trailer, a title of a movie associated with the movie trailer, a font, layout information, a time stamp that represents a time offset into the movie trailer, a location, a language, a company, a universal resource locator (URL), an application programming interface (API), actor information, director information, producer information, studio information, genre, movie trailer length, a theater or a theater room, and wherein the audio data is received via the microphone;

decoding the one or more audio encoding using a decoder;

generating non-audio data comprising the unique identifier responsive to the decoding;

determining that the unique identifier is associated with the movie trailer;

determining at least one of the image, the title, the font, the layout information, the time stamp, the location, the language, the company, the URL, the API, the actor information, the director information, the producer information, the studio information, the genre, the movie trailer length, the theater or the theater room;

generating a prompt for user feedback regarding the movie trailer based at least in part on at least one of the image, the title, the font, the layout information, the time stamp, the location, the language, the company, the URL, the API, the actor information, the director information, the producer information, the studio information, the genre, the movie trailer length, the theater or the theater room;

receiving the user feedback regarding the movie trailer; and sending the user feedback to a remote computing device.

2. The method of claim 1, wherein the non-audio data comprises at least one of a textual representation or a numerical representation of the unique identifier.

3. The method of claim 1, wherein determining that the unique identifier is associated with the movie trailer comprises:

sending the non-audio data comprising the unique identifier to the remote computing device; and receiving a response from the remote computing device, wherein the response comprises an identification of the movie trailer.

4. The method of claim 1, wherein the one or more audio encoding was encoded into an audio format using one or more audio modulation schemes selected from a group consisting of frequency shift keying, phase shift keying, and pulse modulation, and wherein decoding the one or more audio encoding is performed using the one or more audio modulation schemes.

5. The method of claim 1, wherein the one or more audio encoding comprises the image associated with the movie trailer, the method further comprising:

generating the image based on a result of the decoding; and displaying the image by the mobile computing device.

6. The method of claim 5, wherein the one or more audio encoding comprises at least one of the title of the movie associated with the movie trailer, the font or the layout information, the method further comprising:
   determining a placement of at least one of the image or the title on a display of the mobile computing device based on the layout information in the one or more audio encoding; and
   generating an output to the display comprising the image and the title having the determined placement.

7. The method of claim 1, wherein the one or more audio encoding comprises at least one of a first audio encoding or a second audio encoding, wherein the first audio encoding comprises at least one of a first location, a first language, a first company, a first theater or a first theater room, and wherein the first audio coding or the second audio encoding comprises at least one of a second location, a second language, a second company, a second theater or a second theater room, the method further comprising:
   determining whether the mobile computing device is associated with a) at least one of the first location, the first language, the first company, the first theater or the first theater room or with b) the second location, the second language, the second company, the second theater or the second theater room; and
   generating the prompt responsive to determining that the mobile computing device is associated with at least one of the first location, the first language, the first company, the first theater or the first theater room, wherein a different prompt is generated if the mobile computing device is associated with at least one of the second location, the second language, the second company, the second theater or the second theater room.

8. The method of claim 1, wherein an audio watermark of the audio data comprises the one or more audio encoding.

9. The method of claim 1, wherein the one or more audio encoding comprises the time stamp that represents the time offset into the movie trailer, the method further comprising:
   reproducing the time stamp;
   determining, based on the time stamp, the time offset into the movie trailer;
   determining a time at which the movie trailer will end; and
   performing at least one of vibrating or increasing a brightness of a display of the mobile computing device at the time or at a second time that is within a threshold distance from the time.

10. The method of claim 1, further comprising:
   sending the one or more audio encoding to the remote computing device, wherein the decoding of the one or more audio encoding and the generating of the non-audio data are performed by the remote computing device; and
   receiving a response from the remote computing device, wherein the response comprises at least one of the non-audio data or information on the movie trailer.

11. The method of claim 1, wherein the one or more audio encoding comprises at least one of the URL or the API, the method further comprising:
   reproducing at least one of the URL or the API; and
   using at least one of the URL or the API to send the user feedback to the remote computing device.

12. The method of claim 1, wherein the mobile computing device executes a movie application, the method further comprising:
   identifying an additional mobile computing device also executing the movie application;
   establishing a peer-to-peer wireless connection between the mobile computing device and the additional mobile computing device;
   determining that the mobile computing device lacks a network connection; and
   sending the user feedback to the additional mobile computing device with a request for the additional mobile computing device to send the user feedback to the remote computing device.

13. A user device comprising:
   a microphone;
   a display; and
   a processing device operatively coupled to the microphone and to the display, wherein the processing device is to:
      activate the microphone;
      receive audio data of a movie trailer via the microphone, wherein the audio data comprises one or more audio encoding comprising a) a unique identifier associated with the movie trailer and b) at least two of an image associated with the movie trailer, a title of a movie associated with the movie trailer, a font, layout information, a time stamp that represents a time offset into the movie trailer, a location, a language, a company, a universal resource locator (URL), an application programming interface (API), actor information, director information, producer information, studio information, genre, movie trailer length, a theater or a theater room;
      decode the one or more audio encoding using a decoder to generate non-audio data comprising the unique identifier;
      identify the movie trailer from the unique identifier;
      determine at least one of the image, the title, the font, the layout information, the time stamp, the location, the language, the company, the URL, the API, the actor information, the director information, the producer information, the studio information, the genre, the movie trailer length, the theater or the theater room;
      generate a prompt for user feedback regarding a movie associated with the movie trailer based at least in part on at least one of the image, the title, the font, the layout information, the time stamp, the location, the language, the company, the URL, the API, the actor information, the director information, the producer information, the studio information, the genre, the movie trailer length, the theater or the theater room;
      output the prompt to the display;
      receive user feedback regarding the movie associated with the movie trailer; and
      send the user feedback to a remote computing device.

14. The user device of claim 13, wherein to identify the movie trailer the processing device:
   sends the non-audio data comprising the unique identifier to the remote computing device; and
   receives a response from the remote computing device, wherein the response comprises an identification of the movie trailer.

15. The user device of claim 13, wherein the one or more audio encoding comprises the image associated with the movie trailer, and wherein the processing device is further to:
   generate the image based on a result of decoding the one or more audio encoding; and
   output the image to the display.

16. The user device of claim 15, wherein the one or more audio encoding comprises at least one of the title of the movie associated with the movie trailer, the font or the layout information, and wherein the processing device is further to:
- determine a placement of at least one of the image or the title on a display of the user device based on the layout information in the one or more audio encoding; and
- generate an output to the display comprising the image and the title having the determined placement.

17. The user device of claim 13, wherein the one or more audio encoding comprises at least one of a first audio encoding or a second audio encoding, wherein the first audio encoding comprises at least one of a first location, a first language, a first company, a first theater or a first theater room, and wherein the first audio encoding or the second audio encoding comprises at least one of a second location, a second language, a second company, a second theater or a second theater room, and wherein the processing device is further to:
- determine whether the user device is associated with a) at least one of the first location, the first language, the first company, the first theater or the first theater room or with b) the second location, the second language, the second company, the second theater or the second theater room; and
- generate the prompt responsive to determining that the user device is associated with at least one of the first location, the first language, the first company, the first theater or the first theater room, wherein a different prompt is generated if the user device is associated with at least one of the second location, the second language, the second company, the second theater or the second theater room.

18. The user device of claim 13, wherein the one or more audio encoding comprises the time stamp that represents the time offset into the movie trailer, and wherein the processing device is further to:
- reproduce the time stamp;
- determine, based on the time stamp, the time offset into the movie trailer;
- determine a time at which the movie trailer will end; and
- perform at least one of vibrating or increasing a brightness of a display of the user device at the time or at a second time that is within a threshold distance from the time.

19. A non-transitory computer readable medium comprising instructions that, when executed by a user device, cause the user device to perform operations comprising:
- receiving audio data of a movie trailer by the user device, wherein the user device is a mobile computing device comprising a microphone, wherein the audio data comprises one or more audio encoding comprising a) a unique identifier associated with the movie trailer and b) at least two of an image associated with the movie trailer, a title of a movie associated with the movie trailer, a font, layout information, a time stamp that represents a time offset into the movie trailer, a location, a language, a company, a universal resource locator (URL), an application programming interface (API), actor information, director information, producer information, studio information, genre, movie trailer length, a theater or a theater room, and wherein the audio data is received via the microphone;
- decoding the one or more audio encoding using a decoder;
- generating non-audio data comprising the unique identifier responsive to the decoding;
- determining that the unique identifier is associated with the movie trailer;
- determining at least one of the image, the title, the font, the layout information, the time stamp, the location, the language, the company, the URL, the API, the actor information, the director information, the producer information, the studio information, the genre, the movie trailer length, the theater or the theater room;
- generating a prompt for user feedback regarding the movie trailer based at least in part on at least one of the image, the title, the font, the layout information, the time stamp, the location, the language, the company, the URL, the API, the actor information, the director information, the producer information, the studio information, the genre, the movie trailer length, the theater or the theater room;
- receiving the user feedback regarding the movie trailer; and
- sending the user feedback to a remote computing device.

20. The non-transitory computer readable medium of claim 19, wherein the one or more audio encoding comprises the image associated with the movie trailer, the title of the movie associated with the movie trailer and the layout information, and wherein the user device is further to:
- generate the image based on a result of the decoding;
- determine a placement of at least one of the image or the title on a display of the mobile computing device based on the layout information in the one or more audio encoding; and
- generate an output to the display comprising the image and the title having the determined placement.

* * * * *